United States Patent
Ma et al.

(10) Patent No.: US 12,395,965 B2
(45) Date of Patent: Aug. 19, 2025

(54) METHOD FOR PAGING WIRELESS TERMINAL GROUPS

(71) Applicant: ZTE Corporation, Guangdong (CN)

(72) Inventors: Xuan Ma, Guangdong (CN); Mengzhu Chen, Guangdong (CN); Jun Xu, Guangdong (CN); Focai Peng, Guangdong (CN); Xiaoying Ma, Guangdong (CN); Qiujin Guo, Guangdong (CN)

(73) Assignee: ZTE Corporation, Guangdong (CN)

( * ) Notice: Subject to any disclaimer, the term of this patent is extended or adjusted under 35 U.S.C. 154(b) by 337 days.

(21) Appl. No.: 17/816,539

(22) Filed: Aug. 1, 2022

(65) Prior Publication Data
US 2022/0369283 A1    Nov. 17, 2022

Related U.S. Application Data
(63) Continuation of application No. PCT/CN2020/098917, filed on Jun. 29, 2020.

(51) Int. Cl.
*H04W 68/02* (2009.01)
(52) U.S. Cl.
CPC .................. *H04W 68/02* (2013.01)
(58) Field of Classification Search
CPC ...................................................... H04W 68/02
See application file for complete search history.

(56) References Cited

U.S. PATENT DOCUMENTS

| | | | |
|---|---|---|---|
| 2014/0348020 A1 | 11/2014 | Tenny et al. | |
| 2016/0234781 A1 | 8/2016 | Pang et al. | |
| 2020/0221508 A1* | 7/2020 | Huang | H04W 72/23 |
| 2023/0180180 A1* | 6/2023 | Dong | H04W 72/232 |
| | | | 455/458 |

FOREIGN PATENT DOCUMENTS

| | | |
|---|---|---|
| CN | 108353382 A | 7/2018 |
| CN | 110945928 A | 3/2020 |
| CN | 111200870 A | 5/2020 |
| EP | 3 657 864 A1 | 5/2020 |
| WO | WO 2019/062779 A1 | 4/2019 |
| WO | WO 2020/063928 A1 | 4/2020 |
| WO | WO 2020/102972 A1 | 5/2020 |

OTHER PUBLICATIONS

Extended European Search Report for EP Application No. 20943307.7 dated Aug. 30, 2023 (9 pages).
First Office Action for China Patent Application 202080099425.6 dated Jul. 29, 2024 (with English translation) (20 pp.).
Patent Search Report for China Patent Application 202080099425.6 dated Jul. 1, 2024 (with English translation) (4 pp.).

(Continued)

*Primary Examiner* — Pamit Kaur
(74) *Attorney, Agent, or Firm* — Crowell & Moring LLP

(57) ABSTRACT

A wireless communication method includes receiving, from a wireless network node, a paging indication information associated with a paging operation of at least one of a plurality of wireless terminal groups. The paging operation is performed based on the paging indication information.

20 Claims, 5 Drawing Sheets

(56) References Cited

OTHER PUBLICATIONS

Communication for EP Application No. 20 943 307.7 dated Apr. 16, 2025 (5 pages).
International Search Report and Written Opinion received for Application No. PCT/CN2020/098917 mailed Mar. 25, 2021 (7 pages).
ZTE, "Views on power saving enhancement," 3GPP TSG RAN WG1 #101, R1-2003489, Jun. 5, 2020 (14 pp.).
ZTE, "Views on power saving enhancement," 3GPP TSG RAN WG1 #l00bis, R1-2001586, Apr. 30, 2020 (14 pp.).
ZTE, "Views on power saving enhancement," 3GPP TSG RAN WG1 #100, R1-200513, Mar. 6, 2020 (15 pp.).

* cited by examiner

| Common bit field | Bit field 1st group | Bit field 2nd group | Bit field 3rd group | ... |

| Bit field 1st group | Bit field 2nd group | Bit field 3rd group | ... |

METHOD FOR PAGING WIRELESS TERMINAL GROUPS

PRIORITY

This application claims priority as a Continuation of PCT/CN2020/098917, filed on Jun. 29, 2020, entitled "METHOD FOR PAGING WIRELESS TERMINAL GROUPS", published as WO 2022/000187 A1, the entirety of which is incorporated herein by reference.

TECHNICAL FIELD

This document is directed generally to wireless communications.

BACKGROUND

In a 5G mobile communication system, a user equipment (UE) in a radio resource control (RRC) idle mode or an RRC inactive mode monitors a paging occasion (PO) per paging cycle (i.e. discontinuous reception (DRX) cycle). However, the UE may not have paging messages in every paging cycle. In such a case, the UE may monitor a physical downlink control channel (PDCCH) in a corresponding PDCCH monitoring occasion of one paging cycle and cannot successfully decode paging scheduling information in this paging cycle. What is even worse, there may be also no corresponding paging message (e.g. physical downlink shared channel (PDSCH)) in the paging cycle at all. As a result, considerable power may be wasted on the unnecessary PDCCH monitoring, especially when the UE has a low paging probability.

In another scenario, the UE may successfully decode the PDCCH but the paging message (e.g. the PDSCH) scheduled by the PDCCH is for another UE. That is, the UE may spend unnecessary power on receiving the PDSCH unrelated to itself.

Thus, how to eliminate the power consumption spending on the unnecessary paging monitoring becomes a topic of interest.

SUMMARY

This document relates to methods, systems, and devices for paging wireless terminal groups.

The present disclosure relates to a wireless communication method for use in a wireless terminal. The wireless communication method comprises receiving, from a wireless network node, paging indication information associated with a paging operation of at least one of a plurality of wireless terminal groups and performing the paging operation based on the paging indication information.

Various embodiments may In some embodiments implement the following features:

In some embodiments, the wireless terminal is categorized into one of the plurality of wireless terminal groups based on at least one of a subset of an identification of the wireless terminal, a paging probability of the wireless terminal, or at least one higher layer signaling.

In some embodiments, the identification of the wireless terminal is a user equipment identification or a temporary mobile subscription identifier.

In some embodiments, the paging operation comprises at least one of monitoring a paging occasion, not monitoring the paging occasion, receiving, from the wireless network node, at least one of paging scheduling information, a paging message or a reference signal, or not receiving, from the wireless network node, at least one of the paging scheduling information, the paging message or the reference signal, wherein the reference signal comprises at least one of: a synchronization signal block, a channel state information reference signal or a tracking reference signal.

In some embodiments, at least one of the paging occasion, the paging scheduling information or the paging message is in a first paging cycle in which the paging indication information is configured.

In some embodiments, the paging indication information is configured in a first paging cycle, wherein at least one of the paging occasion, the paging scheduling information, the paging message or the reference signal is in at least one second paging cycle subsequent to the first paging cycle.

In some embodiments, the paging indication information comprises at least one of downlink control information, a demodulation reference signal, a time domain resource of a physical downlink control channel carrying paging scheduling information or a frequency domain resource of the physical downlink control channel carrying the paging scheduling information.

In some embodiments, the downlink control information comprises first downlink control information comprising a paging occasion reception indicator field, wherein the paging occasion reception indicator field indicates the paging operation.

In some embodiments, the paging occasion reception indicator field comprises at least one of:
at least one of reserved bits in the first downlink control information,
at least one of reserved bits of a short message field in the first downlink control information, or
a field associated with a configuration of a paging message related operation.

In some embodiments, the downlink control information comprises second downlink control information, wherein the first downlink control information and the second downlink control information are different at at least one of being scrambled by different radio network temporary identifiers, having different time-frequency resources or a bit field indicating one of the first downlink control information or the second downlink control information.

In some embodiments, the second downlink control information does not have the paging occasion reception indicator field.

In some embodiments, the downlink control information comprises third downlink control information comprising at least one of:
a short message field,
at least one paging occasion reception indicator field, indicating the paging operation of at least one of the plurality of wireless terminal groups,
a short message indicator field, indicating a presence or an absence of at least one of the short message field or the at least one paging occasion reception indicator field, or
a reference signal indicator field, indicating a reference signal operation.

In some embodiments, the third downlink control information is configured for at least one of the plurality of wireless terminal groups.

In some embodiments, the short message indicator field comprises at least one of a first codepoint indicating only the at least one paging occasion reception indicator field is present in the third downlink control information, a second codepoint indicating only the short message field is present in the third downlink control information, or a third codepoint indicating both the at least one paging occasion reception indicator field and the short message field are present in the third downlink control information.

In some embodiments, the downlink control information comprises fourth downlink control information, wherein the third downlink control information and the fourth downlink control information are different at at least one of being scrambled by different radio network temporary identifiers, having different time-frequency resources, or having different formats.

In some embodiments, the fourth downlink control information does not have the paging occasion reception indicator field.

In some embodiments, the paging occasion reception indicator field comprises a bitmap, wherein each of bits in the bitmap is associated with one of the plurality of wireless terminal groups.

In some embodiments, the paging occasion reception indicator field comprises at least one identification of the at least one wireless terminal group associated with the paging indication information.

In some embodiments, the identification is one of a group identification, a user equipment identification, a subset of the user equipment identification, a temporary mobile subscription identifier or a subset of the temporary mobile subscription identifier.

In some embodiments, the paging indication information comprises at least one of the time domain resource or the frequency domain resource of the physical downlink control channel, wherein the wireless terminal monitors the physical downlink control channel based on at least one of the time domain resource or the frequency domain resource.

In some embodiments, the downlink control information is associated with a first wireless terminal group and a cyclic redundancy check of the downlink control information is scrambled by a radio network temporary identifier.

In some embodiments, the radio network temporary identifier comprises at least one of a group common radio network temporary identifier configured for the first wireless terminal group and at least one second wireless terminal group of the plurality of wireless terminal groups, or a group radio network temporary identifier configured for the first wireless terminal group.

In some embodiments, the demodulation reference signal comprises at least one of a demodulation reference signal of a physical downlink control channel or a demodulation reference signal of a physical downlink shared channel, wherein an identification of the at least one wireless terminal group which is associated with the paging indication information being used for at least one of scrambling the demodulation reference signal or determining an initializing seed of the demodulation reference signal.

In some embodiments, the identification is one of a group identification, a user equipment identification, a subset of the user equipment identification, a temporary mobile subscription identifier or a subset of the temporary mobile subscription identifier.

The present disclosure relates to a wireless communication method for use in a wireless network node. The wireless communication method comprises transmitting, to at least one wireless terminal, paging indication information associated with a paging operation of at least one of a plurality of wireless terminal groups, and transmitting paging related information based on the paging indication information.

Various embodiments may In some embodiments implement the following features:

In some embodiments, each of the at least one wireless terminal is categorized into one of the plurality of wireless terminal groups based on at least one of a subset of an identification of each of the at least one wireless terminal, a paging probability of each of the at least one wireless terminal, or at least one higher layer signaling, In some embodiments, the identification of each of the at least one wireless terminal is a user equipment identification or a temporary mobile subscription identifier.

In some embodiments, the paging operation comprises at least one of monitoring a paging occasion, not monitoring the paging occasion, receiving, from the wireless network node, the paging related information comprising at least one of paging scheduling information, a paging message or a reference signal, or not receiving, from the wireless network node, the paging related information comprising at least one of the paging scheduling information, the paging message or the reference signal, wherein the reference signal comprises at least one of: a synchronization signal block, a channel state information reference signal or a tracking reference signal.

In some embodiments, at least one of the paging occasion, the paging scheduling information or the paging message is in a first paging cycle in which the paging indication information is configured.

In some embodiments, the paging indication information is configured in a first paging cycle and at least one of the paging occasion, the paging scheduling information, the paging message or the reference signal is in at least one second paging cycle subsequent to the first paging cycle.

In some embodiments, the paging indication information comprises at least one of downlink control information, a demodulation reference signal, a time domain resource a physical downlink control channel carrying paging scheduling information or a frequency domain resource of the physical downlink control channel carrying the paging scheduling information.

In some embodiments, the downlink control information comprises first downlink control information comprising a paging occasion reception indicator field, wherein the paging occasion reception indicator field indicates the paging operation.

In some embodiments, the paging occasion reception indicator field comprises at least one of at least one of reserved bits in the first downlink control information, at least one of reserved bits of a short message field in the first downlink control information, or a field associated with a configuration of a paging message related operation.

In some embodiments, the downlink control information comprises second downlink control information, wherein the first downlink control information and the second downlink control information are different at at least one of being scrambled by different radio network temporary identifiers, having different time-frequency resources, or a bit field indicating one of the first downlink control information or the second downlink control information.

In some embodiments, the second downlink control information does not have the paging occasion reception indicator field.

In some embodiments, the downlink control information comprises third downlink control information comprising at least one of:

a short message field, at least one paging occasion reception indicator field, indicating the paging operation, a short message indicator field, indicating a presence or an absence of at least one of the short message field or the at least one paging occasion reception indicator field, or a reference signal indicator field, indicating a reference signal operation.

In some embodiments, wherein the third downlink control information is configured for at least one of the plurality of wireless terminal groups.

In some embodiments, the short message indicator field comprises at least one of a first codepoint indicating only the at least one paging occasion reception indicator field is present in the third downlink control information, a second codepoint indicating only the short message field is present in the third downlink control information, or a third codepoint indicating both the at least one paging occasion reception indicator field and the short message field are present in the third downlink control information.

In some embodiments, the downlink control information comprises fourth downlink control information, wherein the third downlink control information and the fourth downlink control information are different at at least one of being scrambled by different radio network temporary identifiers, having different time-frequency resources, or having different formats.

In some embodiments, the fourth downlink control information does not have the paging occasion reception indicator field.

In some embodiments, the paging occasion reception indicator field comprises a bitmap, wherein each of bits in the bitmap is associated one of the plurality of wireless terminal groups.

In some embodiments, the paging occasion reception indicator field comprises at least one identification of the at least one wireless terminal group associated with the paging indication information.

In some embodiments, the identification is one of a group identification, a user equipment identification, a subset of the user equipment identification, a temporary mobile subscription identifier or a subset of the temporary mobile subscription identifier.

In some embodiments, the paging indication information comprises at least one of the time domain resource or the frequency domain resource of the physical downlink control channel, wherein the wireless terminal monitors the physical downlink control channel based on at least one of the time domain resource or the frequency domain resource.

In some embodiments, the downlink control information is associated with a first wireless terminal group of the plurality of wireless terminal groups and a cyclic redundancy check of the downlink control information is scrambled by a radio network temporary identifier.

In some embodiments, the radio network temporary identifier comprises at least one of a group common radio network temporary identifier configured for the first wireless terminal group and at least one second wireless terminal group of the plurality of wireless terminal groups, or a group radio network temporary identifier configured for the first wireless terminal group.

In some embodiments, the demodulation reference signal comprises at least one of a demodulation reference signal of a physical downlink control channel or a demodulation reference signal of a physical downlink shared channel, wherein an identification of the at least one wireless terminal group which is associated with the paging indication information being used for at least one of scrambling the demodulation reference signal or determining an initializing seed of the demodulation reference signal.

In some embodiments, the identification is one of a group identification, a user equipment identification, a subset of the user equipment identification, a temporary mobile subscription identifier or a subset of the temporary mobile subscription identifier.

The present disclosure relates to a wireless terminal. The wireless terminal comprises a communication unit, configured to receive, from a wireless network node, paging indication information associated with a paging operation of at least one of a plurality of wireless terminal groups, and a processor configured to perform the paging operation based on the paging indication information.

Various embodiments may In some embodiments implement the following feature:

In some embodiments, the processor is further configured to perform a wireless communication method of any of the foregoing described methods.

The present disclosure relates to a wireless network node. The wireless network node comprises a communication unit configured to transmit, to at least one wireless terminal, paging indication information associated with a paging operation of at least one of a plurality of wireless terminal groups, and transmit paging related information based on the paging indication information.

Various embodiments may In some embodiments implement the following feature:

In some embodiments, the wireless network node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

BRIEF DESCRIPTION OF THE DRAWINGS

Figure 1:
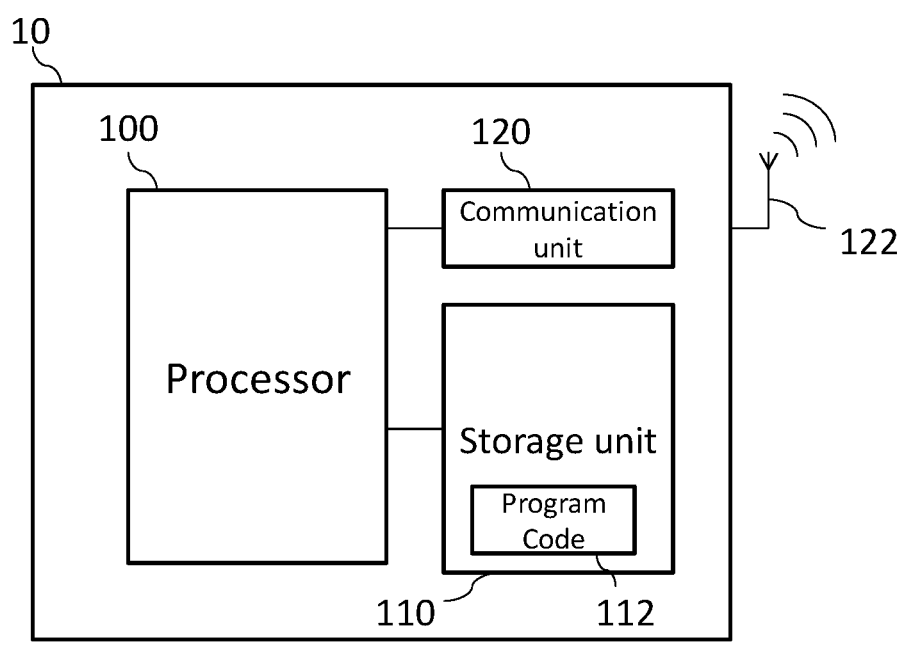
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited thereto. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
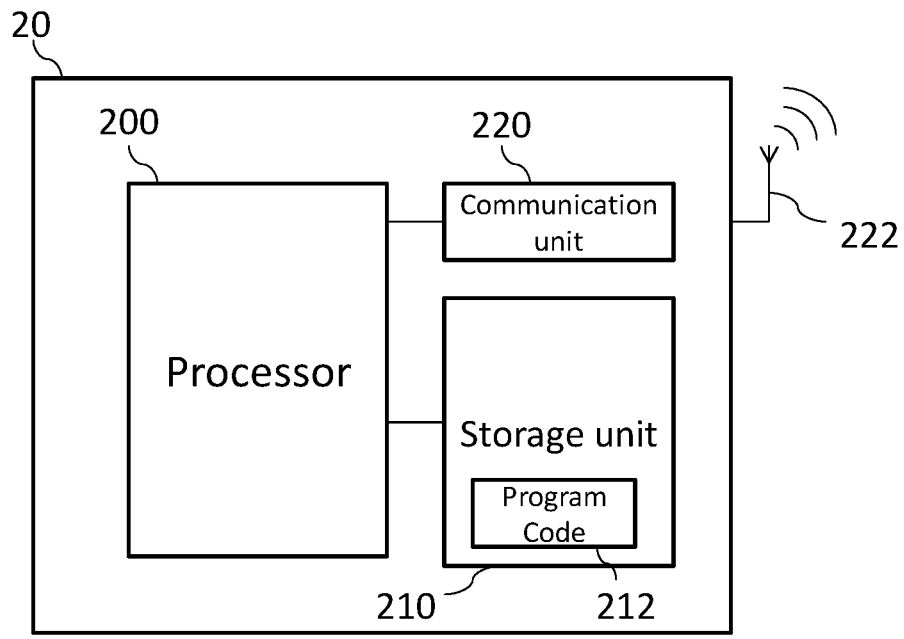
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. UE).

In an embodiment, a paging occasion (PO) is a set of physical downlink control channel (PDCCH) monitoring occasions where paging downlink control information (DCI) can be sent. In addition, one paging frame (PF) is a radio frame and may contain one or multiple PO(s) or a starting point of a PO. The PF and PO for paging are determined by the following formulae:

subframe number (SFN) for the PF is determined by:

$$(SFN+PF\_offset) \bmod T = (T \operatorname{div} N)*(UE\_ID \bmod N)$$

Index (i_s) indicating the index of the PO is determined by:

$$i\_s = \mathrm{floor}(UE\_ID/N) \bmod Ns$$

wherein mod is an abbreviation of the modulo function of acquiring a remainder and UE_ID is an identification (ID) of a UE (e.g. UE ID).

In the present disclosure, the UE ID may be equal to a remainder of dividing a temporary mobile subscription identifier (TMSI) by 1024 (i.e. TMSI mod 1024 or the last 10 bits of the TMSI).

In the present disclosure, the TMSI may be 5G-S-TMSI which is a bit string with 48 bits.

In the present disclosure, a field may represent a bit field.

In the present disclosure, an identification may be an identifier, and vice versa.

In one paging cycle (i.e. discontinuous reception (DRX) cycle), multiple UEs may monitor the same PO. As long as one of the UEs is paged, all of the UEs monitoring the same PO need to receive a corresponding paging message (e.g. a physical downlink shared channel (PDSCH)) scheduled by paging downlink control information (DCI) (e.g. the DCI format 1_0 scrambled by a paging radio network temporary identifier (P-RNTI)) in the paging cycle, resulting in that the UE may waste considerable power on receiving the unrelated paging message. In order to improve the power efficiency of the UE, the present disclosure provides various embodiments of paging methods in the following. Note that skilled person should acknowledge that the following embodiments may be implemented individually or in any possible combination.

Embodiment 1

In this embodiment, various methods of grouping the UEs are introduced. Note that the methods described in this embodiment may be implemented in other embodiments of the present disclosure, to divide (e.g. classify or categorize) the UEs into separate UE groups.

Grouping Method

Mode 1: Grouping Based on the UE ID or the TMSI

In this embodiment, the UEs are divided (e.g. grouped, classified or categorized) into separate UE groups based on the UE ID or the TMSI (e.g. 5G-S-TMSI) of each of the UEs. For example, the UEs monitoring the same PO are divided into separate UE groups based on a subset (e.g. a part, a fraction or at least one bit) of the UE ID or a subset of the TMSI of each of the UEs. Note that each of the UE groups has (e.g. being configured to or being configured with) a group ID.

In an embodiment, the UEs monitoring the same PO are divided into two UE groups based on a single bit of the binary UE ID or the binary TMSI. For example, the bit used for dividing the UEs into the UE groups may be the last bit of the binary UE ID. The UEs whose last bit of the UE ID is "0" are in one UE group and the UEs whose last bit of the binary UE ID is "1" are in another UE group. As an alternative, the bit used for dividing the UEs may be the first bit of the binary UE ID. The UEs whose first bit of the binary UE ID is "0" are in one UE group and the UEs whose first bit of the binary UE ID is "1" are in another UE group. As an alternative, the bit used for dividing the UEs may be a single bit of the TMSI. For example, the UEs whose 11th bit of the TMSI is "0" are in one UE group and the UEs whose 11th bit of the S-TMSI is "1" are in another UE group. Note that the 11th bit of the S-TMSI is acquired by counting the bits of the binary S-TMSI in an order from the least significant bit (LSB) to the most significant bit (MSB) (e.g. from right to left).

In an embodiment, the UEs monitoring the same PO are divided into four UE groups based on two bits of the binary UE ID or the binary TMSI. For example, the UEs are divided into four UE groups based on the last two bits of the binary UE ID or the binary TMSI. As an alternative, the UEs are divided into four UE groups based on the first two bits of the binary UE ID or the binary TMSI. As an alternative, the UEs are divided into four UE groups based on two bits of the binary TMSI. For example, the UEs are divided into four UE groups based on the 11th bit and 12th bit of the TMSI. Note that the 11th bit and 12th bit of the S-TMSI are acquired by counting the bits of the binary S-TMSI in the order from the LSB to the MSB (e.g. from right to left).

In an embodiment, each of the UE groups is corresponding to a group ID. In an embodiment, the group ID may be a decimal number. In an embodiment, the group ID may be a binary sequence with N bit(s), where N is a positive integer.

In an embodiment, the group ID of the UE group is a part of the UE ID or a part of the TMSI. In an embodiment, the group ID may be the bit(s) used for grouping (e.g. dividing) the UEs into the UE groups. For example, when the last two bits of the UE ID are used for grouping the UEs into the UE groups, the group ID of the UE is "00" when the last two bits in the UE ID of the UE are "00", the group ID of the UE is "01" when the last two bits in the UE ID of the UE are "01", and so on.

In an embodiment, the BS (e.g. a gNB) may broadcast group information of grouping the UEs through system information. In an embodiment, the BS broadcasts the number NG of the UE groups and the UE determines its group ID according to the number NG of the UE groups and N bits of its UE ID or the TMSI, where $N=\rceil\log_2(N_G)\lceil$ and $\rceil X \lceil$ is a ceiling function of acquiring the smallest integer greater than or equal to the variable X. For example, the BS may broadcast that the number of the UE groups is 8 (i.e. NG=8). In such a case, the UE may be grouped according to the last 3 bits of the UE ID. In addition, the last three bits of the UE ID may be the group ID of the UE group where the UE is located.

In an embodiment, the BS may broadcast certain bit(s) of the UE ID and the corresponding group ID. For example, when the UEs are divided into three UE groups based on the last two bits of the UE ID. In this example, the BS may broadcast that a group ID "00" is corresponding to the UE ID whose last two bits are "00" or "01", that a group ID "01" is corresponding to the UE ID whose last two bits are "10" and/or that a group ID "10" is corresponding to the UE ID whose last two bits are "11".

Mode 2: Grouping Based on Paging Probability

In this embodiment, the UEs monitoring the same PO are divided into separate UE groups based on the paging probability of each of UEs. In an embodiment, each of UE groups has a group ID. For example, the paging probability may be divided into multiple intervals and the UEs with the paging probability in the same interval are in the same UE group.

For example, the paging probability may be divided into 4 intervals:

Interval I1: the paging probability less than 0.1%;
Interval I2: the paging probability greater than or equal to 0.1% and less than 1%;
Interval I3: the paging probability greater than or equal to 1% and less than 10%; and
Interval I4: the paging probability greater than or equal to 10%.

In such a case, the UE(s) with the paging probability in the interval I1 is in a UE group, the UE(s) with the paging probability in the interval I2 is in another UE group, and so on.

In an embodiment, each of the UE groups is corresponding to a group ID. In an embodiment, the group ID may be a decimal number. In an embodiment, the group ID may be a binary sequence with N bit(s), where N is a positive integer.

In an embodiment, the BS may broadcast the group information of grouping the UEs through the system information. In an embodiment, the BS may broadcast thresholds of dividing the paging probability into separate intervals and the UE determines its group ID according to the paging probability of the UE. For example, the BS may broadcast 3 thresholds 0.001, 0.01 and 0.1. In such a case, the group ID corresponding to the UE with the paging probability less than 0.001 is 0DEC, the group ID of the UE with the paging probability larger than or equal to 0.001 and less than 0.01 is 1DEC, the group ID of the UE with the paging probability greater than or equal to 0.01 and less than 0.1 is 2DEC and the group ID of the UE with the paging probability greater than or equal to 0.1 is 3DEC. Note that the group ID is in the decimal form in this embodiment and can be changed to the binary form.

Mode 3: Grouping Based on the UE ID/TMSI and the Paging Probability

In an embodiment, the number of UEs corresponding to a single interval of the paging probability may be vast. In such a case, the UEs in the same interval of the paging probability may be further divided based on the identifier of the UE (e.g. the UE ID or the TMSI). That is, the UE may be classified into a certain UE group based on both the UE ID/TMSI and the paging probability of the UE.

In an embodiment, the UEs monitoring the same paging occasion are divided into the UE groups according to the combination of the UE ID and the paging probability of the UE. In addition, each of UE groups has (e.g. is configured with or corresponding to) a group ID.

In an embodiment, the paging probability is divided into two intervals, wherein an interval I1 corresponds to the paging probability smaller than 20% and an interval I2 corresponds to the paging probability greater than or equal to 20%. In this embodiment, the number of UEs belonging to the interval I1 is huge and the UEs belonging to the interval I1 are further divided according to the UE ID or the TMSI. For example, among the UEs whose paging probability is in the interval I1, the UEs whose last bit of the binary UE ID is "0" are grouped in one UE group and the UEs whose last bit of binary UE ID is "1" are grouped in another UE group. In addition, the UEs whose paging probability in the interval I2 are in still another group. That is, the UEs is divided into 3 UE groups based on the UE ID and/or the paging probability in this embodiment.

In an embodiment, each of UE groups has a group ID. In an embodiment, the group ID is a decimal number. In an embodiment, the group ID is indicated by N bits binary number, where N is a positive integer.

In an embodiment, the BS may broadcast the group information of grouping the UE through the system information. In an embodiment, the BS broadcasts the thresholds dividing the paging probability into multiple intervals, a part of the UE ID and the corresponding group ID. For example, the BS may broadcasts that the UE is in the UE group with group ID 0 when the UE has the paging probability smaller than 0.2 and the last bit of the UE ID being "0", that the UE is in the UE group with the group ID 0 when the UE has the paging probability smaller than 0.2 and the last bit of the UE ID being "1", that the UE is in the UE group with a group ID 1 when the UE has the paging probability greater than or equal to 0.2 and the last bit of the UE ID being "0", and that the UE is in the UE group with a group ID 2 when the UE has the paging probability greater than or equal to 0.2 and the last bit of the UE ID being "1". In this embodiment, the group ID is represented in the decimal form. In an embodiment, the group ID may be represented in the binary form.

Mode 4: Grouping Based on High-Layer Parameter(s)

In this embodiment, the UEs monitoring the same PO are divided into separate UE groups based on (an indication of) at least one higher layer parameter. In an embodiment, the high layer parameter(s) may be radio resource control (RRC) parameter(s).

In an embodiment, the BS may broadcast the group information of grouping the UEs through system information. In an embodiment, the BS broadcasts certain bit(s) of the UE ID and the group ID of the corresponding UE group.

In an embodiment, all of the UEs support the UE grouping. That is, all of the UEs are categorized into the UE groups.

In an embodiment, some of the UEs support the UE grouping, while some of the UEs do not support the UE grouping. For example, the UE with a strong coverage may support the UE grouping. In other words, the UE may be grouped (e.g. categorized) when its coverage level reaches a certain standard (e.g. threshold). As an alternative or in addition, the UE working in certain scenarios (e.g. reduced capability (Redcap) UE) supports the UE grouping. As an alternative or in addition, the UE operating in certain frequency ranges (e.g. the UE operating in the Frequency Range 2 (FR2)) supports the UE grouping.

Embodiment 2

In a single cell, there may be a considerable number of UEs monitoring the same PO. As long as one of the UEs is paged, all of the UEs monitoring the same PO needs to receive the paging message (e.g. the PDSCH) scheduled by the DCI which is scrambled by the P-RNTI, resulting in decreasing in the power efficiency of the UEs. In such a case, the UEs monitoring the same PO may be divided into the separate UE groups and the paging DCI (e.g. the DCI format 1_0 scrambled by the P-RNTI) may be used to indicate a paging operation of corresponding UEs (e.g. the UE group (s)). For example, the paging operation may be receiving the corresponding paging message (e.g. the PDSCH) or not receiving the paging message. As a result, the power efficiency of the UE is enhanced.

Figure 3:
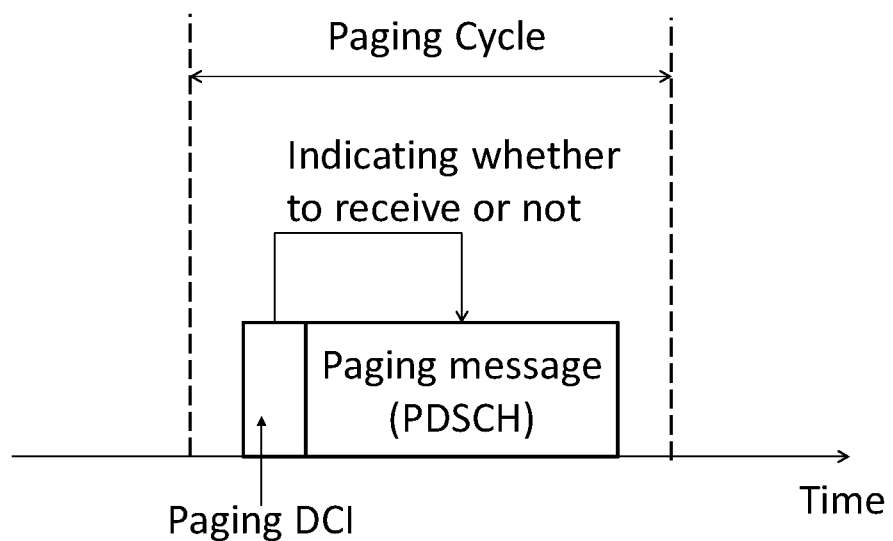
FIG. 3 shows a schematic diagram of a paging occasion according to an embodiment of the present disclosure.

FIG. 3 shows a schematic diagram of a PO according to an embodiment of the present disclosure. In FIG. 3, the paging DCI indicates whether to receive the paging message (e.g. the PDSCH) within the same paging cycle (i.e. the paging operation).

In an embodiment, the paging DCI refers to the DCI with at least one bit defined to indicates whether to receive the paging message within the same paging cycle (i.e. the paging operation). For example, the paging DCI may refer to the DCI format 1_0 with a cyclic redundancy check (CRC) scrambled by the P-RNTI and comprises at least one of the following components:

- a field of short message (8 bits)
- a field of a short message indicator (2 bits): Indicating whether the field of the short message and corresponding scheduling information for paging are present,
- a field of frequency domain resource assignment ($\lceil \log_2(N_{RB}^{DL,BWP}(N_{RB}^{DL,BWP})+1/2) \rceil$ bits, where $N_{RB}^{DL,BWP}$ is the number of resource blocks in a downlink bandwidth part and varies depending on the search space where the DCI format 1_0 is transmitted): Indicating the frequency domain resource assignment of the following paging message,
- a field of time domain resource assignment (4 bits): Indicating the time domain resource assignment of the following paging message,
- a field of virtual resource block to physical resource block (VRB-to-PRB) mapping: (1 bit): Indicate whether the interleave is used, and
- a field of a modulation and coding scheme (MCS) (5 bits),
- a field of transport block (TB) scaling (2 bits): Indicating a scaling factor, and
- reserved bits.

In the present disclosure, the field of the short message may be called the short message field or simply the short message. Similarly, the field of the short message indicator may be called the short message indicator field or the short message indicator, the field of the MCS may be called the MCS field or the MCS, and so on.

In an embodiment, a subset of the reserved bits in the paging DCI is defined to indicate the paging operation of the corresponding UE(s). For example, N bit(s) out of the reserved bits in the paging DCI is defined to indicate the paging operation of the corresponding UE(s), where N is an integer which is greater than or equal to 0 and is smaller than or equal to 6 (i.e. $0 \leq N \leq 6$). As an alternative of in addition, a subset of reserved bits in the short message field may be defined to indicate the paging operation of the corresponding UE(s). For example, M bit(s) out of the reserved bits in the short message field is defined to indicate the paging operation of the corresponding UE(s), where M is an integer which is greater than or equal to 0 and is smaller than or equal to 5 (i.e. $0 \leq M \leq 5$). As an alternative or in addition, certain bit(s) or field(s) in the paging DCI may be redefined to indicate the paging operation of the corresponding UE(s). For example, the MCS field may be interpreted to indicate the paging operation of the corresponding UE. Note that other fields in the paging DCI may also be redefined to indicate the paging operation of the corresponding UE(s). In an embodiment, the field redefined to indicate the paging operation of the corresponding UE(s) may be a field associated with a configuration of a paging message related operation. For example, the paging message related operation may be receiving the paging message.

In an embodiment, the paging operation indicated by (e.g. associated with) the paging DCI may comprise at least one of receiving the paging message (e.g. the PDSCH) within the current paging cycle, not receiving the paging message within the current paging cycle, monitoring the PDSCH within the current paging cycle or not monitoring the PDSCH within the current paging cycle. As an alternative or in addition, the paging operation indicated by (e.g. associated with) the paging DCI may comprise at least one of activating a reference signal, de-activating a reference signal, updating a reference signal. In an embodiment, the reference signal comprises at least one of a synchronization signal block (SSB), a channel state information reference signal (CSI-RS) or a tracking reference signal.

In the following, the bit(s) or the field that indicates the paging operation of the UE is called a PO reception indicator field(s) or a PO reception indicator.

Mode 1: PO Reception Indicator Field Comprises a Bitmap.

In an embodiment, the PO reception indicator field comprises (e.g. is) a bitmap, wherein each bit in the bitmap is corresponding to one UE group. For example, the PO reception indicator field comprises the bitmap with four bits which are separately associated with four UE groups (e.g. one-to-one mapping). That is, the four bits in the bitmap respectively indicate the paging operations of the UEs in the four UE groups.

In an embodiment of the PO reception indicator field comprising the bitmap, the bit "0" indicates that the UE(s) in the corresponding UE group determines whether to receive the paging message (e.g. the PDSCH) in the paging cycle according to the paging DCI. In addition, the bit "1" indicates that the UE(s) in the corresponding UE group does not receive the paging message in the paging cycle.

In an embodiment of the PO reception indicator field comprising the bitmap, the bit "1" indicates that the UE(s) in the corresponding UE group determines whether to receive the paging message (e.g. the PDSCH) in the paging cycle according to the paging DCI. In addition, the bit "0" indicates that the UE(s) in the corresponding UE group does not receive the paging message in the paging cycle.

In an embodiment, the paging DCI does not carry the scheduling information for paging. In such a case, the UE ignores the PO reception indicator field indicating the paging operation.

In an embodiment, the number of bits in the PO reception indicator field is larger than the number of the UE groups. In such a case, the bits associated with the UE groups are selected in an order starting from the MSB (i.e. from left to right) or the LSB (i.e. from right to left). Note that the remaining bits without corresponding UE group may be ignored by the UE.

In an embodiment, the number of bits of the PO reception indicator field is smaller than the number of UE groups. In such a case, the bits of the PO reception indicator field are corresponding to the UE groups in an ascending order of the group IDs of the UE groups. The UE(s) in the UE group(s) without the corresponding bit in the PO reception indicator field operates as the PO reception indicator field is absent (e.g. determining whether to receive the paging message based on (e.g. depending on or in response to) the paging DCI).

In an embodiment of the number of bits of the PO reception indicator field being smaller than the number of the UE groups, the bits of the PO reception indicator field(s) are corresponding to the UE groups in a descending order of the group IDs of the UE groups. The UE group(s) without the corresponding bit in the PO reception indicator field operate(s) as if the PO reception indicator field were absent (e.g. determining whether to receive the paging message based on the paging DCI).

In an embodiment of the number of bits of the PO reception indicator field being smaller than the number of the UE groups, the relationship between the bits of the PO reception indicator field and the UE groups is determined by an RRC indication. In this embodiment, the UE group(s) without the corresponding bit in the PO reception indicator field operates as the PO reception indicator field is absent (e.g. determining whether to receive the paging message based on the paging DCI).

In an embodiment of the number of bits of the PO reception indicator field being smaller than the number of the UE groups, a single bit in the PO reception indicator field may correspond to multiple UE groups. For example, if the PO reception indicator field comprises three bits and there are four UE groups UEG1, UEG2, UEG3 and UEG4, the first bit of the PO reception indicator field may correspond to the UEG1 and UEG4, and the second and third bits of the PO reception indicator field may correspond to the UEG2 and UEG3 respectively.

In the embodiment of the PO reception indicator field comprising the bitmap, the PO reception indicator field may indicate the paging operations of multiple UE groups at the same time. Thus, the bit overhead is reduced and the power saving gain is guaranteed.

Mode 2: At Least One Bit in the PO Reception Indicator Field Indicates One Group ID of the UE Group and the Paging Operation Corresponding to the Indicated UE Group is Predefined.

In an embodiment, the PO reception indicator field indicates the paging operation of the corresponding UE group by indicating the group ID of the UE group, e.g., when the number of UE groups is larger than the number of bits in the PO reception indicator field.

In an embodiment, all of the bits in the PO reception indicator field are used to indicate a single group ID. For example, when there are six bits in the PO reception indicator field, a codepoint "000001" of the PO reception indicator field may indicate the UE group with a group ID "1" and another codepoint "000100" of the PO reception indicator field may indicate the UE group with a group ID "4".

In an embodiment, a part (e.g. a subset, at least one) of the bits in the PO reception indicator field is used to indicate single group ID. For example, the bits with high weightings in the PO reception indicator field of the PO reception indicator field are used to indicate one group ID. Note that the bits with greater weightings may comprise the MSB and/or at least one bit subsequent to the MSB. As an alternative or in addition, the remining bit(s), which is not used to indicate the group ID in the PO reception indicator field, is ignored. In an embodiment with eight UE groups, three bits are needed to represent one group ID. In this embodiment, there are 6 bits in the PO reception indicator field and the 3 bits with high weightings (i.e. the MSB and 2 bits next to the MSB) in the PO reception indicator field are used to indicate the group ID. In such a case, both codepoints "000011" and "000000" indicate the UE group with group ID "0" because the 3 bits with low weightings are ignored. Similarly, a codepoint "100000" indicates the UE group with group ID "4".

In an embodiment, the bits of the PO reception indicator field indicate multiple group IDs of the UE groups. For example, when a group ID is represented by 3 bits, the PO reception indicator field with 6 bits may indicate two UE groups. More specifically, a codepoint "000100" indicates the two UE groups whose group IDs are "0" and "4" respectively via bits "000" and "100".

In an embodiment, the UE in the UE group indicated by the PO reception indicator field operates as if the paging DCI would not have the PO reception indicator field (e.g. receiving the paging message (e.g. PDSCH) within the current paging cycle based on (depending on or in response to) the paging DCI) and the UE in the UE group which is not indicated by the PO reception indicator field does not receive the paging message (e.g. the PDSCH) within the current paging cycle.

In an embodiment, the UE in the UE group indicated by the PO reception indicator field does not receive the paging message (e.g. the PDSCH) within the current paging cycle and the UE in the UE group which is not indicated by the PO reception indicator field operates as if the paging DCI would not have the PO reception indicator field (e.g. receiving the paging message (e.g. PDSCH) within the current paging cycle based on (depending on or in response to) the paging DCI).

Mode 3: Multiple Bits in the PO Reception Indicator Field Indicate a Subset of the UE ID/5G-S-TMSI and the Paging Operation is Predefined.

In an embodiment, the PO reception indicator field indicates the paging operation of corresponding UE(s) by indicating a subset of the UE ID (converted into 10 bits binary number) or the TMSI (e.g. 5G-S-TMSI).

In order to simplify the illustrations, the following embodiments use the UE ID to represent both the UE ID and the TMSI.

In an embodiment, the PO reception indicator field indicates the MSB of the binary UE ID. In this embodiment, the UE operates as if the paging DCI would not have the PO reception indicator field (e.g. receiving the paging message within the current paging cycle based on the paging DCI) when the PO reception indicator field is equal to the MSB of its binary UE ID. When the PO reception indicator field is not equal to the MSB of the binary UE ID, the UE does not receive the paging scheduling information (e.g. the PDSCH) within this paging cycle.

In an embodiment, the PO reception indicator field indicates the MSB of the binary UE ID. In this embodiment, the UE does not receive the paging scheduling information (e.g. the PDSCH) within this paging cycle when the when the PO reception indicator field is equal to the MSB of its binary UE ID. When the PO reception indicator field is not equal to the MSB of the binary UE ID, the UE operates as if the paging DCI would not have the PO reception indicator field (e.g. receiving the paging message within the current paging cycle based on the paging DCI).

In an embodiment, the paging DCI with the PO reception indicator field has (e.g. being scrambled by) an RNTI different from that of the existing paging DCI (e.g. the DCI format 1_0 scrambled by P-RNTI in Rel-16). That is, the BS may transmit the paging DCI with the PO reception indicator field and the paging DCI without the PO reception indicator field and these type types of paging DCI have different RNTIs. In the present disclosure, the different RNTIs represent different types of the RNTI (e.g. the P-RNTI, a cell RNTI, a system information RNTI, etc.) and/or the RNTIs with different values. For example, the paging DCI with the PO reception indicator field may be scrambled by the P-RNTI and the paging DCI without the PO reception indicator field (e.g. the existing DCI) may be scrambled by the cell RNTI. In an embodiment, the paging DCI with the PO reception indicator field may be scrambled by the P-RNTI with a value of FFFEHEX and the paging DCI without the PO reception indicator field (e.g. the existing DCI) may be scrambled by the P-RNTI with a value of FFFDHEX.

In an embodiment, the UE which does not support the paging DCI with the PO reception indicator field may receive the existing paging DCI (i.e. without the PO reception indicator field) and operates based on the received paging DCI. When the UE supports the paging DCI with the PO reception indicator field, the UE may receive the paging DCI with the PO reception indicator field.

In an embodiment, the paging DCI including the PO reception indicator field and the paging DCI without the PO reception indicator field are transmitted on different time-frequency resources. That is, the UE determines whether the received paging DCI has the PO reception indicator field according to the time-frequency resource location configured for the paging DCI.

In an embodiment, when both the paging DCI of R16 and the new paging DCI are configured at the same time-frequency resource location to the UE, the UE operates based on the existing paging DCI.

In an embodiment, the UE is configured with the paging DCI including the PO reception indicator field and the paging DCI without the PO reception indicator field on the same time-frequency resource location. In this embodiment, the UE may operate based on the paging DCI without the PO reception indicator field. As an alternative, the UE may operate based on the paging DCI with the PO reception indicator field.

Embodiment 3

In a single cell, there may be a lot of UEs monitoring the same PO. As long as one of the UEs is paged, all of the UEs monitoring the same PO need to receive the paging message (e.g. the PDSCH) scheduled by the corresponding DCI, resulting in poor power efficiency. In an embodiment, the UEs monitoring the same PO may be grouped (e.g. Embodiment 1) and the paging DCI (e.g. the DCI format 1_0 scrambled by the P-RNTI) may be used to indicate the UEs' paging operation, e.g., to receive or not to receive the PO (e.g. the PDCCH and/or the PDSCH) or to receive or not receive the paging message (e.g. the PDSCH). Thus, the power efficiency of the UE is enhanced.

In the present disclosure, the PO refers to paging related information in the paging cycle (e.g. the PDCCH carrying the paging scheduling information (e.g. paging DCI) and/or the PDSCH carrying the paging message). That is, the paging operation "receiving the PO" may comprise monitoring the PDCCH monitoring occasion for the paging scheduling information and determining whether to receive the PDSCH according to the received paging scheduling information. Similarly, the paging operation "Not receiving the PO" comprises not monitoring the PDCCH, not receiving the PDCCH and/or not receiving the paging message (e.g. the PDSCH) on the PDSCH monitoring occasion. Note that, these definitions of the paging operation may be applicable to other embodiments of the present disclosure.

In an embodiment, N bit(s) out of the reserved bits in the paging DCI (e.g. the DCI format 1_0 scrambled by the P-RNTI (e.g. in Rel-16)) is defined as the PO reception indicator field indicating the paging operation of the corresponding UE, where $0 \le N \le 6$. In an embodiment, M bit(s) out of the reserved bits in the short message field of the paging DCI (e.g. the DCI format 1_0 scrambled by the P-RNTI (e.g. in Rel-16)) is as the PO reception indicator field indicating the paging operation of the corresponding UE, where $0 \le M \le 5$. In an embodiment, certain bit(s) in the paging DCI (e.g. the DCI format 1_0 scrambled by the P-RNTI (e.g. in Rel-16)) is redefined to indicate the paging operation of the corresponding UE. For example, certain bit(s) in the MCS field may be interpreted to indicate whether the UE receives the paging message. In an embodiment, the paging DCI with the PO reception indicator field follows an existing format (e.g. the DCI format 1_0). In an embodiment, the DCI with the PO reception indicator field has the same DCI size with the existing DCI (e.g. the DCI format 1_0 scrambled by the P-RNTI in Rel-16).

In an embodiment, the paging operation of the corresponding UE comprises receiving and/or not receiving the PO (e.g. the PDCCH and/or the PDSCH) in at least one subsequent paging cycle (e.g. next paging cycle). In an embodiment, the paging operation of the corresponding UE comprises monitoring and/or not monitoring the PO (e.g. the PDCCH and/or the PDSCH) in the subsequent paging cycle(s). In an embodiment, the paging operation of the corresponding UE comprises receiving and/or not receiving the paging message (e.g. the PDSCH) in the subsequent paging cycle(s). In an embodiment, the paging operation of the corresponding UE comprises receiving and/or not receiving the PO (e.g. the PDCCH and/or the PDSCH) in the subsequent paging cycle(s) and receiving and/or not receiving the paging message (e.g. the PDSCH) within the current paging cycle. In an embodiment, the paging operation of the corresponding UE comprises receiving and/or not receiving the paging message (e.g. the PDSCH) in the subsequent paging cycle(s) and receiving and/or not receiving the paging message within the current paging cycle.

In an embodiment, the paging operation of the corresponding UE comprises receiving and/or not receiving synchronization signal block(s) (SSB(s)) in the subsequent paging cycle(s). For example, when the paging operation indicated by the PO reception indicator field is not receiving the PO in the next paging cycle, the UE may not need to receive the SSB(s) in the next paging cycle. That is, the PO reception indicator field indicates the paging operation "not receiving the PO in the next paging cycle" may also indicate the UE not to receive the SSB(s) (e.g. the SSB for synchronization, automatic gain control (AGC) and time-frequency tracing will not be received)) in the next paging cycle.

In the following, the PO reception indicator field that indicate the paging operation of the UE may be called PO reception indicator.

In an embodiment, when the paging operation indicated by the PO reception indicator field is not to receive the paging message (PDSCH) in the next paging cycle, it will not receive part of the SSBs before the PO in the next paging cycle.

In an embodiment, the paging operation of the corresponding UE comprises at least one of activating a reference signal, de-activating a reference signal or updating a reference signal. In an embodiment, the reference signal comprises at least one of: the SSB, the CSI-RS or the tracking reference signal.

Figure 4:
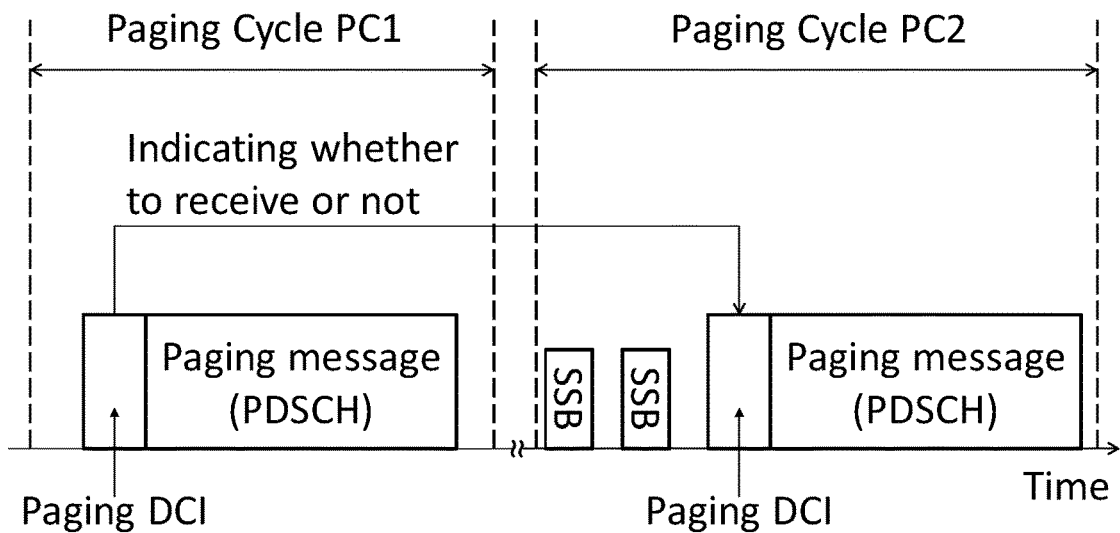
FIG. 4 shows a schematic diagram of a paging occasion in contiguous paging cycles according to an embodiment of the present disclosure.

FIG. 4 shows a schematic diagram of the PO in contiguous paging cycles according to an embodiment of the present disclosure. In FIG. 4, the paging DCI (e.g. the PO reception indicator field) in a paging cycle PC1 indicates the paging operation of whether to receive the paging DCI (e.g. the paging scheduling information) in a subsequent (e.g. next) paging cycle PC2. In an embodiment of the PO reception indicator field in the paging DCI in the paging cycle PC1 indicating the paging operation of not receiving the paging DCI in the paging cycle PC2, the PO reception indicator field in the paging DCI in the paging cycle PC1 may also (implicitly) indicate not receiving at least one SSB which is before the paging DCI and in the paging cycle PC2 (e.g. at least one of two SSBs shown in FIG. 4).

Figure 5:
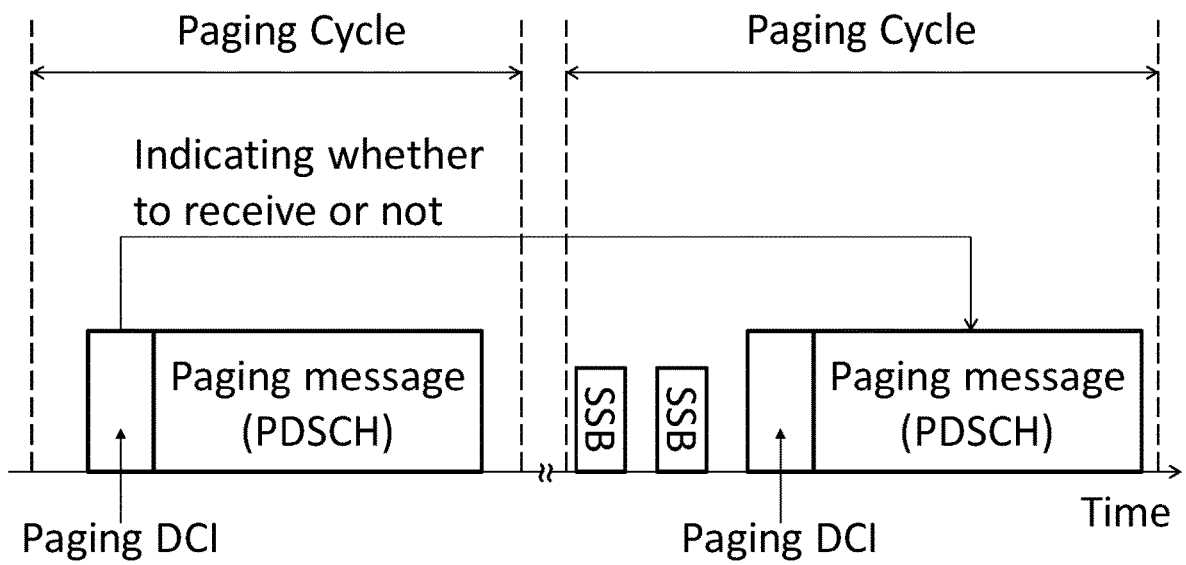
FIG. 5 shows a schematic diagram of a paging occasion in contiguous paging cycles according to an embodiment of the present disclosure.

FIG. 5 shows a schematic diagram of the PO in contiguous paging cycles according to an embodiment of the present disclosure. In FIG. 5, the paging DCI (e.g. the PO reception indicator field) in a paging cycle PC1 indicates the paging operation of whether to receive the paging message (e.g. the PDSCH) in a subsequent (e.g. next) paging cycle PC2.

Relationships between the PO reception indicator field and the UE:

Mode 1: PO Reception Indicator Field Comprises a Bitmap

In an embodiment, the PO reception indicator field comprises (e.g. is) a bitmap, wherein each bit in the bitmap is corresponding to one UE group. For example, the PO reception indicator field comprises the bitmap with four bits which are separately associated with four UE groups (e.g. one-to-one mapping). That is, the four bits in the bitmap respectively indicate the paging operations of the UEs in the four UE groups.

In an embodiment of the PO reception indicator field comprising the bitmap, the bit "0" indicates that the UE(s) in the corresponding UE group does not receive the PO (e.g. the PDCCH and the PDSCH) in the next paging cycle. In addition, the bit "1" indicates that the UE(s) in the corresponding UE group receives the PO in the next paging cycle.

In an embodiment of the PO reception indicator field comprising the bitmap, the bit "0" indicates that the UE(s) in the corresponding UE group receives the PO (e.g. the PDCCH and the PDSCH) in the next paging cycle. In addition, the bit "1" indicates that the UE(s) in the corresponding UE group does not receive the PO in the next paging cycle.

In an embodiment of the PO reception indicator field comprising the bitmap, the bit "0" indicates that the UE(s) in the corresponding UE group determines whether to receive the paging message (e.g. PDSCH) in the next paging cycle according to the paging DCI in the next paging cycle. In addition, the bit "1" indicates that the UE(s) in the corresponding UE group does not receive the PO in the next paging cycle.

In an embodiment of the PO reception indicator field comprising the bitmap, the bit "1" indicates that the UE(s) in the corresponding UE group determines whether to receive the paging message (e.g. the PDSCH) in the next paging cycle according to the paging DCI in the next paging cycle. In addition, the bit "0" indicates that the UE(s) in the corresponding UE group does not receive the paging message in the next paging cycle.

In an embodiment of the PO reception indicator field comprising the bitmap, the bit "0" indicates that the UE(s) in the corresponding UE group determines whether to receive the paging message (e.g. the PDSCH) in the current paging cycle and in the next paging cycle according to the paging DCI respectively in the current paging cycle and in the next paging cycle. In addition, the bit "1" indicates that the UE in the corresponding UE group does not receive the paging message in the current paging cycle the next paging cycle.

In an embodiment of the PO reception indicator field comprising the bitmap, the bit "1" indicates that the UE(s) in the corresponding UE group determines whether to receive the paging message (e.g. the PDSCH) in the current paging cycle and in the next paging cycle according to the paging DCI respectively in the current paging cycle and in the next paging cycle. In addition, the bit "0" indicates that the UE(s) in the corresponding UE group does not receive the paging message in the current paging cycle the next paging cycle.

In an embodiment of the PO reception indicator field comprising the bitmap, the bit "0" indicates that the UE(s) in the corresponding UE group determines whether to receive the paging messages (e.g. the PDSCH) in the current paging cycle and in the next paging cycle according to the paging DCI in the current paging cycle and the next paging cycle. In addition, the bit "1" indicates that the UE(s) in the corresponding UE group does not receive the paging message in the current paging cycle and that the UE does not receive the PO (e.g. the PDCCH and the PDSCH) in the next paging cycle.

In an embodiment of the PO reception indicator field comprising the bitmap, the bit "1" indicates that the UE(s) in the corresponding UE group determines whether to receive the paging messages (e.g. the PDSCH) in the current paging cycle and in the next paging cycle according to the paging DCI in the current paging cycle and the next paging cycle. In addition, the bit "0" indicates that the UE(s) in the corresponding UE group does not receive the paging message in the current paging cycle and that the UE does not receive the PO (e.g. the PDCCH and the PDSCH) in the next paging cycle.

In an embodiment of the UE being indicated not to receive the PO in the next paging cycle, the UE does not receive all of the SSBs in the next paging cycle.

In an embodiment of the UE being indicated not to receive the PO in the next paging cycle, the UE does not receive the SSB(s) before the PO of the next paging cycle (e.g. the SSB for synchronization, the AGC and the time-frequency tracing may not be received).

In such a case, the bits associated with the UE groups are selected in an order starting from the MSB (i.e. from left to right) or the LSB (i.e. from right to left). Note that the remaining bits without corresponding UE group are ignored by the UE.

In an embodiment, the number of bits of the PO reception indicator field is smaller than the number of UE groups. In such a case, the bits of the PO reception indicator field are corresponding to the UE groups in an ascending order of the group IDs of the UE groups. The UE(s) in the UE group(s) without the corresponding bit in the PO reception indicator field operate(s) as if the PO reception indicator field were absent (e.g. determining whether to receive the paging message based on the paging DCI).

In an embodiment of the number of bits of the PO reception indicator field being smaller than the number of the UE groups, the bits of the PO reception indicator field(s) are corresponding to the UE groups in a descending order of the group IDs of the UE groups. The UE group(s) without the corresponding bit in the PO reception indicator field operates as if the PO reception indicator field were absent (e.g. determining whether to receive the paging message based on the paging DCI).

In an embodiment of the number of bits of the PO reception indicator field being smaller than the number of the UE groups, the relationship between the bits of the PO reception indicator field and the UE groups is determined by the RRC indication. In this embodiment, the UE group(s) without the corresponding bit in the PO reception indicator field operate(s) as if the PO reception indicator field were absent (e.g. determining whether to receive the paging message based on the paging DCI).

In an embodiment of the number of bits of the PO reception indicator field being smaller than the number of the UE groups, a single bit in the PO reception indicator field may correspond to multiple UE groups. For example, if the PO reception indicator field comprises three bits and there are four UE groups UEG1, UEG2, UEG3 and UEG4, the first bit of the PO reception indicator field may correspond to the UEG1 and UEG4, and the second and third bits of the PO reception indicator field may correspond to the UEG2 and UEG3 respectively.

Mode 2: At Least One Bit in the PO Reception Indicator Field Indicates One Group ID of the UE Group and the Paging Operation Corresponding to the Indicated UE Group is Predefined In an embodiment, the PO reception indicator field indicates the paging operation of the corresponding UE group by indicating the group ID of the UE group, e.g., when the number of UE groups is larger than the number of bits in the PO reception indicator field.

In an embodiment, all of the bits in the PO reception indicator field are used to indicate a single group ID. For example, when there are six bits in the PO reception indicator field, a codepoint "000001" of the PO reception indicator field may indicate the UE group with a group ID '1' and another codepoint "000100" of the PO reception indicator field may indicate the UE group with a group ID '7'.

In an embodiment, a part (e.g. a subset) of the bits in the PO reception indicator field is used to indicate single group ID. For example, the bits with high weightings in the PO reception indicator field. of the PO reception indicator field are used to indicate one group ID.

Note that the bits with greater weightings may comprise the MSB and at least one bit subsequent to the MSB. As an alternative or in addition, the remaining bit(s), which is not used to indicate the group ID in the PO reception indicator field, is ignored. In an embodiment with eight UE groups, three bits are needed to represent one group ID. In this embodiment, there are 6 bits in the PO reception indicator field and the 3 bits with the high weightings (i.e. the MSB and 2 bits next to the MSB) in the PO reception indicator field are used to indicate the group ID. In such a case, both codepoints "000011" and "000000" indicate the UE group with group ID '0' because the 3 bits with low weightings are ignored. Similarly, a codepoint "100000" indicates the UE group with group ID '7'.

In an embodiment, the bits of the PO reception indicator field indicate multiple group IDs of the UE groups. For example, when a group ID is represented by 3 bits, the PO reception indicator field with 6 bits may indicate two UE groups. More specifically, a codepoint "000100" indicates the two UE groups whose group IDs are "0" and "7" respectively via bits "000" and "100".

In an embodiment, the UE in the UE group indicated by the PO reception indicator field operates as if the paging DCI would not have the PO reception indicator field (e.g. receiving the PO in the next paging cycle) and the UE in the UE group which is not indicated by the PO reception indicator field does not receive the PO within the next paging cycle.

In an embodiment, the UE in the UE group indicated by the PO reception indicator field does not receive the PO within the next paging cycle. In addition, the UE in the UE group which is not indicated by the PO reception indicator field operate(s) as if the paging DCI sould not have the PO reception indicator field (e.g. receiving the PO in the next paging).

In an embodiment, the UE in the UE group indicated by the PO reception indicator field operates as if the paging DCI would not have the PO reception indicator field (e.g. receiving the paging scheduling information in the next paging cycle) and the UE in the UE group which is not indicated by the PO reception indicator field would not receive the paging scheduling information in the next paging cycle.

In an embodiment, the UE in the UE group indicated by the PO reception indicator field does not receive the paging scheduling information within the next paging cycle. In addition, the UE in the UE group which is not indicated by the PO reception indicator field operates as if the paging DCI would not have the PO reception indicator field (e.g. receiving the paging scheduling information in the next paging cycle).

In an embodiment, the UE in the UE group indicated by the PO reception indicator field operates as if the paging DCI would not have the PO reception indicator field (e.g. receiving the paging scheduling information in the current paging cycle and the next paging) and the UE in the UE group which is not indicated by the PO reception indicator field would not receive the paging scheduling information in the current paging cycle and the next paging cycle.

In an embodiment, the UE in the UE group indicated by the PO reception indicator field does not receive the paging scheduling information within the current paging cycle and the next paging cycle. In addition, the UE in the UE group which is not indicated by the PO reception indicator field operates as if as the paging DCI would not have the PO reception indicator field (e.g. receiving the paging scheduling information in the current paging cycle and the next paging cycle).

In an embodiment, the UE in the UE group indicated by the PO reception indicator field operates as if the paging DCI would not have the PO reception indicator field (e.g. receiving the paging scheduling information in the current paging cycle and receiving the PO in the next paging) and the UE in the UE group which is not indicated by the PO reception indicator field would not receive the paging scheduling information in the current paging cycle and would not receive the PO in the next paging cycle.

In an embodiment, the UE in the UE group indicated by the PO reception indicator field does not receive the paging scheduling information within the current paging cycle and does not receive the PO in the next paging cycle. In addition, the UE in the UE group which is not indicated by the PO reception indicator field operates as if the paging DCI would not have the PO reception indicator field (e.g. receiving the paging scheduling information in the current paging cycle and receiving the PO in the next paging cycle).

Mode 3: Multiple Bits in the PO Reception Indicator Field Indicate a Subset of the UE ID/5G-S-TMSI and the Paging Operation is Predefined In an embodiment, the PO reception indicator field indicates the paging operation of corresponding UE(s) by indicating a subset of the UE ID (converted into 10 bits binary number) or the TMSI (e.g. 5G-S-TMSI).

In order to simplify the illustrations, the following embodiments use the UE ID to represent both the UE ID and the TMSI.

In an embodiment, the PO reception indicator field indicates the MSB of the binary UE ID. In this embodiment, the UE operates as if the paging DCI would not have the PO reception indicator field (e.g. receiving the paging message in the next paging cycle based on the paging DCI in the next paging cycle) when the PO reception indicator field is equal to the MSB of its binary UE ID. When the PO reception indicator field is not equal to the MSB of the binary UE ID, the UE does not receive the paging message (e.g. the PDSCH) in the next paging cycle.

In an embodiment of the PO reception indicator field indicating the MSB of the binary UE ID, the UE does not receive the paging message (e.g. the PDSCH) in the next paging cycle when the PO reception indicator field is equal to the MSB of its binary UE ID. In this embodiment, when the PO reception indicator field is not equal to the MSB of the binary UE ID, the UE operates as if the paging DCI would not have the PO reception indicator field (e.g. receiving the paging message in the next paging cycle based on the paging DCI in the next paging cycle).

In an embodiment, the PO reception indicator field indicates the LSB of the binary UE ID. In this embodiment, the UE operates as if the paging DCI would not have the PO reception indicator field (e.g. receiving the paging message in the next paging cycle based on the paging DCI in the next paging cycle) when the PO reception indicator field is equal to the LSB of its binary UE ID. In this embodiment, when the PO reception indicator field is not equal to the LSB of the binary UE ID, the UE does not receive the paging message (e.g. PDSCH) in the next paging cycle.

In an embodiment of the PO reception indicator field indicating the LSB of the binary UE ID, the UE does not receive the paging message (e.g. the PDSCH) in the next paging cycle when the PO reception indicator field is equal to the LSB of its binary UE ID. In this embodiment, when the PO reception indicator field is not equal to the LSB of the binary UE ID, the UE operates as if the paging DCI would not have the PO reception indicator field (e.g. receiving the paging message in the next paging cycle based on the paging DCI in the next paging cycle).

In an embodiment of the PO reception indicator field indicating the MSB of the binary UE ID, the UE receives the PO in the next paging cycle when the PO reception indicator field is equal to the MSB of its binary UE ID. In this embodiment, when the PO reception indicator field is not equal to the MSB of the binary UE ID, the UE does not receive the PO in the next paging cycle.

In an embodiment of the PO reception indicator field indicating the MSB of the binary UE ID, the UE does not receive the PO in the next paging cycle when the PO reception indicator field is equal to the MSB of its binary UE ID. In this embodiment, when the PO reception indicator field is not equal to the MSB of the binary UE ID, the UE receives the PO in the next paging cycle.

In an embodiment of the PO reception indicator field indicating the LSB of the binary UE ID, the UE receives the PO in the next paging cycle when the PO reception indicator field is equal to the LSB of its binary UE ID. In this embodiment, when the PO reception indicator field is not equal to the LSB of the binary UE ID, the UE does not receive the PO in the next paging cycle.

In an embodiment of the PO reception indicator field indicating the LSB of the binary UE ID, the UE does not receive the PO in the next paging cycle when the PO reception indicator field is equal to the LSB of its binary UE ID. In this embodiment, when the PO reception indicator field is not equal to the LSB of the binary UE ID, the UE receives the PO in the next paging cycle.

In an embodiment of the PO reception indicator field indicating the MSB of the binary UE ID, the UE operates as if the paging DCI would not have the PO reception indicator field (e.g. receiving the paging message in the current paging cycle and receiving the PO in the next paging cycle) when the PO reception indicator field is equal to the MSB of its binary UE ID. In this embodiment, when the PO reception indicator field is not equal to the MSB of the binary UE ID, the UE does not receive the paging message in the current paging cycle and does not receive the PO in the next paging cycle.

In an embodiment of the PO reception indicator field indicating the MSB of the binary UE ID, the UE does not receive the paging message in the current paging cycle and does not receive the PO in the next paging cycle when the PO reception indicator field is equal to the MSB of its binary UE ID. In this embodiment, when the PO reception indicator field is not equal to the MSB of the binary UE ID, the UE operates as if the paging DCI would not have the PO reception indicator field (e.g. receiving the paging message in the current paging cycle and receiving the PO in the next paging cycle).

In an embodiment of the PO reception indicator field indicating the LSB of the binary UE ID, the UE operates as if the paging DCI would not have the PO reception indicator field (e.g. receiving the paging message in the current paging cycle and receiving the PO in the next paging cycle) when the PO reception indicator field is equal to the LSB of its binary UE ID. In this embodiment, when the PO reception indicator field is not equal to the LSB of the binary UE ID, the UE does not receive the paging message in the current paging cycle and does not receive the PO in the next paging cycle.

In an embodiment of the PO reception indicator field indicating the LSB of the binary UE ID, the UE does not receive the paging message in the current paging cycle and does not receive the PO in the next paging cycle when the PO reception indicator field is equal to the LSB of its binary UE ID. In this embodiment, when the PO reception indicator field is not equal to the LSB of the binary UE ID, the UE operates as if the paging DCI would not have the PO reception indicator field (e.g. receiving the paging message in the current paging cycle and receiving the PO in the next paging cycle). In an embodiment of the PO reception indicator field indicating the MSB of the binary UE ID, the UE operates as if the paging DCI would not have the PO reception indicator field (e.g. receiving the paging message in the current paging cycle and receiving the paging scheduling information in the next paging cycle) when the PO reception indicator field is equal to the MSB of its binary UE ID. In this embodiment, when the PO reception indicator field is not equal to the MSB of the binary UE ID, the UE does not receive the paging message in the current paging cycle and does not receive the paging scheduling information in the next paging cycle.

In an embodiment of the PO reception indicator field indicating the MSB of the binary UE ID, the UE does not receive the paging message in the current paging cycle and does not receive the paging scheduling information in the next paging cycle when the PO reception indicator field is equal to the MSB of its binary UE ID. In this embodiment, when the PO reception indicator field is not equal to the MSB of the binary UE ID, the UE operates as if the paging DCI would not have the PO reception indicator field (e.g. receiving the paging message in the current paging cycle and receiving the PO paging scheduling information in the next paging cycle).

In an embodiment of the PO reception indicator field indicating the LSB of the binary UE ID, the UE operates as if the paging DCI would not have the PO reception indicator field (e.g. receiving the paging message in the current paging cycle and receiving the paging scheduling information in the next paging cycle) when the PO reception indicator field is equal to the LSB of its binary UE ID. In this embodiment, when the PO reception indicator field is not equal to the LSB of the binary UE ID, the UE does not receive the paging message in the current paging cycle and does not receive the paging scheduling information in the next paging cycle.

In an embodiment of the PO reception indicator field indicating the LSB of the binary UE ID, the UE does not receive the paging message in the current paging cycle and does not receive the paging scheduling information in the next paging cycle when the PO reception indicator field is equal to the LSB of its binary UE ID. In this embodiment, when the PO reception indicator field is not equal to the LSB of the binary UE ID, the UE operates as if the paging DCI would not have the PO reception indicator field (e.g. receiving the paging message in the current paging cycle and receiving the PO paging scheduling information in the next paging cycle).

In an embodiment, the paging DCI with the PO reception indicator field has (e.g. being scrambled by) an RNTI different from that of the existing paging DCI. That is, the BS may transmit the paging DCI with the PO reception indicator field and the paging DCI without the PO reception indicator field and these type types of paging DCI have different RNTIs. In the present disclosure, the different RNTIs represent different types of the RNTI (e.g. the P-RNTI, the cell RNTI, the system information RNTI, etc.) and/or the RNTIs with different values. For example, the paging DCI with the PO reception indicator field may be scrambled by the P-RNTI and the paging DCI without the PO reception indicator field (e.g. the existing DCI) may be scrambled by the cell RNTI. In an embodiment, the paging DCI with the PO reception indicator field may be scrambled by the P-RNTI with a value of FFFEHEX and the paging DCI without the PO reception indicator field (e.g. the existing DCI) may be scrambled by the P-RNTI with a value of FFFDHEX.

In an embodiment, the UE which does not support the paging DCI with the PO reception indicator field may receive the existing paging DCI (i.e. without the PO reception indicator field) and operates based on the received paging DCI. When the UE supports the paging DCI with PO reception indicator field, the UE may receive the paging DCI with the PO reception indicator field.

In an embodiment, the paging DCI including the PO reception indicator field and the paging DCI without the PO reception indicator field are transmitted on different time-frequency resources. That is, the UE determines whether the received paging DCI has the PO reception indicator field according to the time-frequency resource location configured for the paging DCI.

In an embodiment, when both the paging DCI of R16 and the new paging DCI are configured at the same time-frequency resource location to the UE, the UE operates based on the existing paging DCI.

In an embodiment, the UE is configured with the paging DCI including the PO reception indicator field and the paging DCI without the PO reception indicator field on the same time-frequency resource location. In this embodiment, the UE may operate based on the paging DCI without the PO reception indicator field. As an alternative, the UE may operate based on the paging DCI with the PO reception indicator field.

Embodiment 4

In a single cell, a significant number of UEs may monitor the same paging occasion. As long as one of the UEs is paged, all of the UEs monitoring the same paging occasion need to receive the paging message (e.g. the PDSCH) scheduled by the paging DCI, resulting in a decreasing in the power efficiency of the UE. In this embodiment, group common paging DCI is introduced to indicate the paging operations of the UE groups, to improve the power efficiency of the UE.

In an embodiment, the group common paging DCI comprises at least one of the following bit fields: the short message indicator field, the short message field, the PO reception indicator field(s) (used to indicate the paging operation of the UE group(s)) or a reference signal indicator field. For example, when the group common paging DCI comprises the field of the short message, the UE is able to receive the short message without receiving a paging message/PO at the next paging cycle. In an embodiment, these bit fields may not always exist or not exist at the same time.

Figures 6, 7, 8:
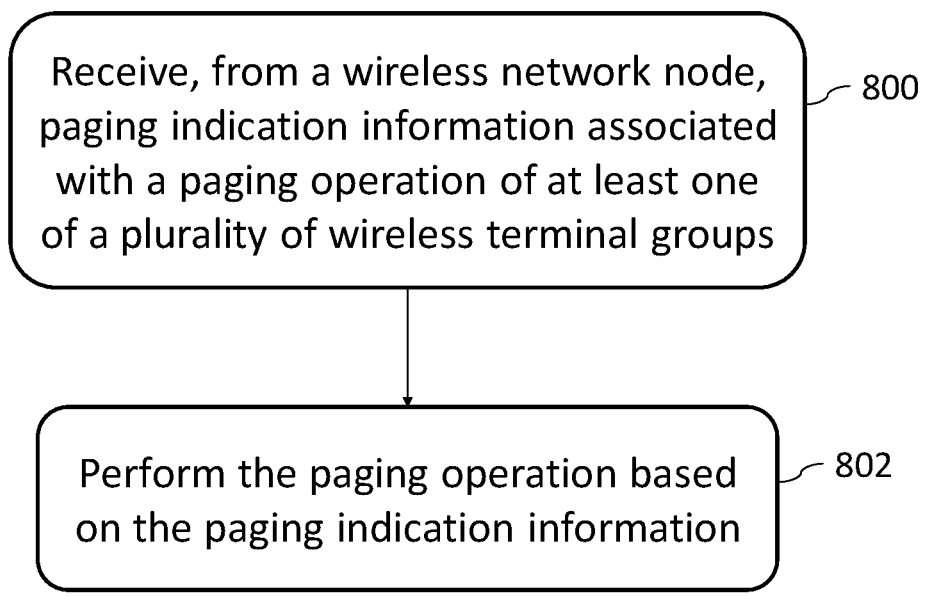
FIG. 6 shows a schematic diagram of group common paging downlink control information according to an embodiment of the present disclosure.
FIG. 7 shows a schematic diagram of group common paging downlink control information according to an embodiment of the present disclosure.
FIG. 8 shows a flowchart of a process according to an embodiment of the present disclosure.

FIG. 6 shows a schematic diagram of the group common paging DCI according to an embodiment of the present disclosure. In FIG. 6, the bit fields are in a sequence of a common bit field, a bit field for 1st UE group, a bit field for a 2nd UE group, and so on. In an embodiment, the common bit field includes multiple bit fields (i.e. multiple function indicators). For example, the common bit field includes the short message indicator field, the short message field, etc. In an embodiment, the bit field corresponding each of the UE groups comprises multiple bit fields (i.e. multiple function indicators). In an embodiment, the short message indicator field is comprised in the common bit field. In an embodiment, the reference signal indicator field is comprised in the common bit field. In an embodiment, both the short message indicator field and the short message field are comprised in the common bit field.

FIG. 7 shows a schematic diagram of the group common paging DCI according to an embodiment of the present disclosure. In FIG. 7, the group common paging DCI does not have the common bit field shown in FIG. 6 and the bit fields are in a sequence of a bit field for 1st UE group, a bit field for a 2nd UE group, and so on. In an embodiment, the bit field corresponding each of the UE groups comprises multiple bit fields (i.e. multiple function indicators). In an embodiment, the bit field position of each UE group is indicated by the higher-layer signaling.

In an embodiment, the short message indicator field comprises one bit, where the bit '0' indicates that "Only PO reception information is present in the DCI" and the bit '1' indicates that "Both PO reception information and short message are present in the DCI".

In an embodiment, the short message indicator field comprises one bit, where the bit '1' indicates that "Only PO reception information is present in the DCI" and the bit '0' indicates that "Both PO reception information and short message are present in the DCI".

In an embodiment, the bit field of the short message indicator comprises two bits and the meaning of the bit field of the short message indicator is shown in the following table:

| Bit field | Short Message indicator |
| --- | --- |
| 00 | Reserved |
| 01 | Only PO reception information is present in the DCI |
| 10 | Only short message is present in the DCI |
| 11 | Both PO reception information and short message are present in the DCI |

In an embodiment, the short message field comprises eight bits, which are the same as the short message field defined in Rel-16.

In an embodiment, the short message field comprises three bits, and the short message field are the same with the first three bits (e.g. the MSB and two bits next to the MSB) in the short message field defined in Rel-16.

In an embodiment, the PO reception indicator field is a bitmap whose size is equal to the number of UE groups (monitoring the same paging occasion). In an embodiment, the PO reception indicator field indicates the UE in the corresponding UE group to receive or not to receive the paging message (PDSCH) within the current paging cycle. In an embodiment, the PO reception indicator field indicates the UE in the corresponding UE group to receive or not to receive the PO (e.g. the PDCCH and the PDSCH) within the current paging cycle. In an embodiment, the PO reception indicator field indicates the UE in the corresponding UE group to receive or not to receive the PO (e.g. the PDCCH and the PDSCH) in the subsequent paging cycle(s) (e.g. the next paging cycle). In an embodiment, the PO reception indicator field indicates the UE in the corresponding UE group to receive or not to receive the paging message (e.g. the PDSCH) in the subsequent paging cycle(s) (e.g. the next paging cycle). In an embodiment, the PO reception indicator field indicates the UE in the corresponding UE group to monitor or not to monitor the PO (e.g. the PDCCH and the PDSCH) within the current paging cycle. In an embodiment, the PO reception indicator field indicates the UE in the corresponding UE group to monitor or not to monitor the PO (the PDCCH and PDSCH) in the subsequent paging cycle(s) (e.g. the next paging cycle). In an embodiment, the PO reception indicator field indicates the UE in the corresponding UE group to monitor or not to monitor the paging message (e.g. the PDSCH) in the subsequent paging cycle(s) (e.g. the next paging cycle).

In an embodiment, when the UE is indicated not to receive the PO within the current paging cycle, the UE stops receiving the paging scheduling information and stop monitoring PDCCH occasions(s) for paging within the current paging cycle. In an embodiment, when the UE is indicated not to receive the PO in the next paging cycle, the UE does not receive all of the SSBs in the next paging cycle. In an embodiment, when the UE is indicated not to receive the PO in the next paging cycle, the UE does not receive the SSB(s) before the PO of the next paging cycle (e.g. the SSB for synchronization, the AGC and the time-frequency tracing).

In an embodiment, the bit field of the PO reception indicator comprises 1 bit and meaning of the PO reception indicator field is shown as the following table:

| Bit field | PO reception information |
|---|---|
| 0 | Indicating that the UE in the corresponding UE group determines whether to receive the paging message (PDSCH) within the current paging cycle according to the paging DCI; as an alternative, indicating that the UE in the corresponding UE group determines whether to receive the PO (PDCCH + PDSCH) within the current paging cycle according to the paging DCI; as an alternative, indicating that the UE in the corresponding UE group determines whether to receive the paging message (PDSCH) in the next paging cycle according to the paging DCI in the next paging cycle; as an alternative, indicating that the UE in the corresponding UE group determines whether to receive the PO (PDCCH + PDSCH) in the next paging cycle according to the paging DCI in the next paging cycle. |
| 1 | Indicating that the UE in the corresponding UE group does not receive the paging message (PDSCH) within the current paging cycle; as an alternative, indicating that the UE in the corresponding UE group not to receive the PO (PDCCH + PDSCH) within the current paging cycle; as an alternative, indicating that the UE in the corresponding UE group not to receive the paging message (PDSCH) in the next paging cycle; as an alternative, indicating that the UE in the corresponding UE group not to receive the PO (PDCCH + PDSCH) in the next paging cycle. |

In an embodiment, the meanings of the bit '0' and '1' in the above table are exchanged.

In an embodiment, the reference signal indicator field indicates at least one of activating a reference signal, de-activating a reference signal, updating a reference signal. In an embodiment, the reference signal comprises at least one of the SSB, the CSI-RS or the tracking reference signal.

In an embodiment, the group common paging DCI is defined as a new DCI format.

In an embodiment, the BS may transmit the group common DCI and the DCI of another format (e.g. the DCI format 1_0 scrambled by the P-RNTI). In this embodiment, the group common paging DCI and the DCI of another format have the same time domain resource. In an embodiment, the group paging DCI is located before the DCI of another format (e.g. the DCI format 1_0 scrambled by the P-RNTI) in the time domain.

In an embodiment, the group common paging DCI can be aligned with the size of the paging DCI of the existing DCI format. For example, the group common paging DCI has the same size with the DCI format 1_0. As an alternative, the group paging DCI has the same size with the DCI which is not scrambled by the cell RNTI.

Embodiment 5

In a single cell, there may be a lot of UEs monitoring the same paging occasion. As long as one of the UEs is paged, all of the UEs monitoring the same paging occasion needs to receive the paging message (e.g. the PDSCH) scheduled by the paging DCI, resulting in poor power efficiency. In this embodiment, the BS (e.g. gNB) may send multiple DCI on the time-frequency resources configured in UE search space and CORESET, wherein each DCI indicates the paging operation of single UE group.

In an embodiment, the DCI is the DCI format 1_0 scrambled by the P-RNTI. In an embodiment, one reserved bit in the DCI format 1_0 scrambled by the P-RNTI is defined to indicate the UE to receive or not to receive the paging message (e.g. PDSCH) within the current paging cycle. In an embodiment, one reserved bit in the DCI format 1_0 scrambled by the P-RNTI is defined to indicate the UE to monitor or not to monitor the paging message (e.g. the PDSCH) within the current paging cycle. In an embodiment, one reserved bit in the short message field is defined to indicate the UE to receive or not to receive the paging message (e.g. the PDSCH) within the current paging cycle.

In an embodiment of defining one reserved bit in the DCI format 1_0 scrambled by the P-RNTI to indicate the UE to receive/monitor or not to receive/monitor the paging message within the current paging cycle, the bit '0' indicates that the UE in the corresponding UE group determines whether to receive/monitor the paging message (e.g. the PDSCH) in the current paging cycle according to the paging DCI and the bit '1' indicates that the UE in the corresponding UE group does not receive the paging message in the current paging cycle.

In an embodiment of defining one reserved bit in the DCI format 1_0 scrambled by the P-RNTI to indicate the UE to receive/monitor or not to receive/monitor the paging message within the current paging cycle, the bit '1' indicates that the UE in the corresponding UE group determines whether to receive/monitor the paging message (e.g. the PDSCH) in the current paging cycle according to the paging DCI and the bit '0' indicates that the UE in the corresponding UE group does not receive the paging message in the current paging cycle.

In an embodiment, when the paging DCI does not carry the paging scheduling information, the PO reception indicator field that indicates whether the UE receives the paging message (e.g. PDSCH) in the paging cycle is ignored.

In an embodiment, the multiple DCI configured in the same PO are scrambled respectively by the group IDs of the corresponding UE groups. In an embodiment, the relationship between UE group(s) and the DCI(s) is predefined. In an embodiment, the relationships between UE groups and DCI is configured by the higher layer (signaling).

In the Embodiment 5, the operations of each UE group can be distinguished without increasing the decoding complexity. In this embodiment, a UE without the paging scheduling requirement may not receive the PDSCH. Thus, the power consumption of the UE is reduced.

Embodiment 6

In a single cell, there may be a huge number of UEs monitoring the same paging occasion. As long as one of the UEs is paged, all of the UEs monitoring the same paging occasion need to receive the paging message (PDSCH) scheduled by the DCI scrambled by the P-RNTI, resulting in poor power efficiency. In this embodiment, the paging DCI (e.g. the DCI format 1_0 scrambled by the P-RNTI) corresponding to different UE groups is separately scrambled by different group identifiers (e.g. RNTIs) of corresponding UE groups. In such a case, the UE can successfully decode only the paging DCI scrambled by the group identifier of its UE group. Therefore, the UE in one UE group with a group identifier is prevented from receiving the paging message configured for the UE group with another group identifier and the power efficiency of the UE is improved.

In an embodiment, the UEs monitoring the same PO are divided into separate UE groups. In an embodiment, each of the UE groups has its own group ID.

In the present disclosure, the group identifiers used for scrambling the paging DCI may be RNTIs or group RNTIs.

In an embodiment, various RNTIs can be used as the group identifiers scrambling the paging DCI (e.g. the DCI format 1_0 scrambled by the P-RNTI). In an embodiment, the RNTI may be used to scramble a CRC of the paging DCI. In an embodiment, each of the RNTIs has 16 bits in total. In an embodiment, the RNTI is used for the last 16 bits of the CRC in the corresponding paging DCI.

In an embodiment, there are NG RNTIs, where NG is a positive integer. In an embodiment, NG is equal to the number of the UE groups. In an embodiment, one RNTI is corresponding to one UE group. In an embodiment, NG is smaller than the number of the UE groups. In an embodiment, one RNTI may correspond to multiple UE groups. In an embodiment, there are NC group common identifiers (e.g. group common RNTIs), where NC is a positive integer. In an embodiment, single group common RNTI is corresponding to multiple UE groups.

In an embodiment, each of the UEs is allocated with a group RNTI corresponding to its own UE group. As an alternative or in addition, each of the UEs may be allocated at least one group common RNTI. In an embodiment, all of the UEs monitoring the same paging occasion may share the same group common RNTI (e.g. NC equals to 1). In an embodiment, several UE groups may share the same group common RNTI (e.g. NC is greater than 1). In an embodiment, the UE decodes the received paging DCI with its group RNTI and group common RNTI respectively in the monitored PO (e.g. the PDCCH). In an embodiment, the UE is allocated only the group RNTI of the corresponding UE group. In an embodiment, in its PDCCH monitoring occasion, the UE uses the allocated group RNTI to decode the received paging DCI. In an embodiment, when the UE fails to decode the paging DCI, the UE decodes the received paging DCI as a legacy UE.

In an embodiment, the group RNTI corresponding to each of the UE groups is related to (e.g. associated with) the corresponding group ID. In an embodiment, the group RNTI corresponding to the UE group is the group ID of the UE group in the hexadecimal form. In an embodiment, the group RNTI corresponding to each of the UE groups is determined (e.g. generated) based on the corresponding group ID. For example, the group RNTI of the UE group may be a sum of the hexadecimal representation the corresponding group ID and FFF3HEX. In an embodiment, the group common RNTI is one of reserved RNTIs excluding those configured for the group RNTIs. For example, the reserved RNTI's range is from FFF3HEX to FFFDHEX. In an embodiment, the group common identifier is selected from a scope of 0001HEX to FFF2HEX excluding codepoint(s) configured for the group RNTIs.

In an embodiment, the group common RNTI for all of the UEs monitoring the same paging occasion is FFFDHEX. In addition, the group RNTI corresponding to the UE group whose group ID is 0 is FFF3HEX. Similarly, the group RNTI corresponding to the UE group whose group ID is 3 is FFF6HEX. In this embodiment, the UE whose group ID is 0 uses its group identifier (i.e. FFF3HEX) and the common identifier (i.e. FFFDHEX) to decode the received paging DCI when monitoring the PO (e.g. the PDCCH) in the paging cycle.

In an embodiment, the group common RNTI of the UE group of the group ID with the value of 1 or 2 is FFFAHEX and the group common RNTI for the UE group of the group ID with the value of 3 or 4 is FFFBHEX. In addition, the group RNTI corresponding to the UE group of the group ID with the value of 1 is 0001HEX, the group RNTI corresponding to the UE group of the group ID with the value of 2 is 0002HEX, and so on. In such a case, the UE having the group ID with the value of 1 respectively uses 0001HEX and FFFAHEX to decode the received paging DCI when monitoring the PO (e.g. the PDCCH) in the paging cycle. If the paging DCI is decoded successfully, the UE operates based on the received paging DCI (e.g. receiving the paging message based on the received paging DCI). If the paging DCI is not successfully decoded, the UE does not receive the paging message in the paging cycle.

In an embodiment, the group common RNTI is selected from the reserved RNTIs (e.g. the reserved RNTI's scope is from FFF3HEX to FFFDHEX). In this embodiment, the group RNTI corresponding to each of the UE groups may relates to the UE ID and/or the TMSI. Note that, the UEs may be grouped based on the UE ID and/or the 5G-5-TMSI in this embodiment. More specifically, the group RNTI corresponding to each of the UE groups may be a part (e.g. a subset) of the UE ID and/or the 5G-S-TMSI. For example, the UEs with the UE ID whose last two bits are "00", "01", "10" or "11" are allocated respectively to the four group RNTIs. The group RNTI corresponding to the UE of the UE ID with the last two bits being "01" is 0001HEX, the group RNTI corresponding to the UE of the UE ID with the last two bits being "02" is 0002HEX, and so on. Note that, more bits of the UE ID may be used as the group RNTI.

In an embodiment, both the group common RNTI and the group RNTI consist of bit string with specific patterns.

In an embodiment, the BS broadcasts the group common RNTI and the group RNTI to the corresponding UE.

In an embodiment, the group common RNTI is configured for the UEs with the same UE ID. In an embodiment, one group RNTI is corresponding to at least one UE group.

Embodiment 7

In a single cell, there may be a significant number of UEs monitoring the same PO. As long as one of the UEs is paged, all of the UEs monitoring the same PO need to receive the paging message (e.g. the PDSCH) scheduled by the paging DCI, resulting in that the UE may waste the power on receiving the unrelated paging message. In this embodiment, the demodulation reference signal (DMRS) of the PDCCH and/or the PDSCH is scrambled and only the UE (e.g. the UE group) which successfully receives the DMRS can decode the PDCCH and/or the PDSCH. Therefore, the UE avoids wasting the power on processing the PDCCH and/or the PDSCH which is not configured for it.

In an embodiment, the UEs monitoring the same PO are grouped into the UE groups (e.g. embodiment 1). In this embodiment, each of the UE groups is corresponding to a group ID. In an embodiment, the group ID is a decimal number. As an alternative or in addition, the group ID is indicated by a binary number with N bits, wherein N is a positive integer.

In an embodiment, the DMRS of the PDCCH may be scrambled by the group ID of the corresponding UE group. For example, the group ID is used as a part of the pseudo-random sequence generator of the DMRS. In an embodiment, the DMRS of the PDCCH may be scrambled by the UE ID or TMSI of the corresponding UE. For example, the UE ID and/or the TMSI is used as a part of the pseudo-random sequence generator of the DMRS.

In an embodiment, the DRMS sequence $r_l(m)$ for an OFDM symbol l is defined by:

$$r_l(m) = \frac{1}{\sqrt{2}}(1 - 2 \cdot c(2m)) + j\frac{1}{\sqrt{2}}(1 - 2 \cdot c(2m+1))$$

where the pseudo-random sequence c(i) is defined by a length-31 Gold sequence.

In an embodiment, the pseudo-random sequence generator is initialized with:

$$c_{init}=(2^{17}(N_{symb}^{slot}n_{s,f}^{\mu}+l+1)(2N_{ID}+1)+2N_{ID}) \bmod 2^{31}$$

where $N_{symb}^{slot}$ indicates the number of symbols within one slot, $n_{s,f}^{\mu}$ is the slot number within a frame, the $N_{ID}$ is the group ID of UE and mod is the modulus function of acquiring the remainder. In an embodiment, $N_{ID}$ is the value of the decimal number corresponding to a part (e.g. a subset) of bits in the UE ID (the UE ID is represented in binary mode) or a part (e.g. a subset) of bits in the 5G-S-TMSI. For example, $N_{ID}$ may be the last 5 bits of the UE ID.

In an embodiment, the pseudo-random sequence generator is initialized with:

$$c_{init}=(2^{17}(N_{symb}^{slot}n_{s,f}^{\mu}+l+1)(2N_{ID}+1)+2N_{ID}+N_{ID\_1}) \bmod 2^{31}$$

Where $c_{init}$ is an initialization seed, $N_{ID}$ is indicated by the higher-layer parameter pdcch-DMRS-ScramblingID (if provided) or equal to the cell ID (otherwise). In an embodiment, $N_{ID\_1}$ is the group ID of the UE. In an embodiment, $N_{ID}$ is the value of the decimal number corresponding to a part (e.g. a subset) of bits in the UE ID (the UE ID is represented in binary mode) or a part (e.g. a subset) of bits in the TMSI. For example, A $N_{ID}$ may be the last 5 bits of the UE ID.

In an embodiment, the DMRS of the PDSCH may be scrambled with a similar method of scrambling the PDCCH. For example, the group ID of the corresponding UE group may be used as a part of the pseudo-random sequence generator of the DMRS. As an alternative or in addition, the UE ID and/or the TMSI of the corresponding UE is used as a part of the pseudo-random sequence generator of the DMRS.

FIG. 8 shows a flowchart of a process according to an embodiment of the present disclosure. The process shown in FIG. 8 may be used in a wireless terminal (e.g. the UE) and comprises the following steps:

Step 800: Receive, from a wireless network node, paging indication information associated with a paging operation of at least one of a plurality of wireless terminal groups.

Step 802: Perform the paging operation based on the paging indication information.

In FIG. 8, the wireless terminal receives the paging indication information (e.g. the paging DCI with the PO reception indicator field) from the wireless network node (e.g. the BS or the gNB), wherein the paging indication information is associated with a paging operation of at least one of a plurality of wireless terminal groups. Based on (e.g. depending on, in response to) the received paging indication information, the wireless terminal performs the paging operation.

In an embodiment, the wireless terminal is categorized into one of the plurality of wireless terminal groups based on at least one of: a subset of an identification of the wireless terminal, a paging probability of the wireless terminal, or at least one higher layer signaling. In this embodiment, the identification of the wireless terminal is a UE ID or a TMSI (e.g. 5G-S-TMSI). Regarding the details of dividing the wireless terminals into separate wireless terminal group it may be referred to the Embodiment 1 and the content disclosed therein is not narrated herein for brevity.

In an embodiment, the paging operation comprises at least one of monitoring a paging occasion, not monitoring the paging occasion, receiving, from the wireless network node, at least one of paging scheduling information, a paging message or a reference signal, or not receiving, from the wireless network node, at least one of the paging scheduling information, the paging message or the reference signal. In this embodiment, the reference signal comprises at least one of: an SSB, a CSI-RS or a tracking reference signal. Regarding the details related to the paging operation it may be referred to any of the Embodiments 2 to 7 and the content disclosed therein is not narrated herein for brevity.

In an embodiment, at least one of the paging occasion, the paging scheduling information or the paging message are in a first paging cycle in which the paging indication information is configured. That is, the paging indication information and at least one of the paging occasion, the paging scheduling information or the paging message are in the same paging cycle. Regarding the details related to the paging operation within the first paging cycle in which the paging indication information is configured (e.g. current paging cycle) it may be referred to any of the Embodiments 2 to 7 and the content disclosed therein is not narrated herein for brevity.

In an embodiment, the paging indication information is configured in a first paging cycle and at least one of the paging occasion, the paging scheduling information, the paging message and the reference signal are in at least one second paging cycle subsequent to the first paging cycle. In other words, at least one of the paging occasion, the paging scheduling information, the paging message or the reference signal is in subsequent paging cycles after the paging cycle in which the paging indication information is configured. Regarding the details related to the paging operation within the at least one second paging cycle (e.g. next paging cycle) subsequent to the first paging cycle of the paging indication information (e.g. current paging cycle) it may be referred to the Embodiment 3 and/or 4 and the content disclosed therein is not narrated herein for brevity.

In an embodiment, the paging indication information comprises at least one of DCI, a DMRS, a time domain resource of a PDCCH carrying paging scheduling information or a frequency domain resource of the PDCCH carrying the paging scheduling information. Regarding the details related to the components comprised in the paging indication information it may be referred to the Embodiments 2 to 5 and the content disclosed therein is not narrated herein for brevity.

In an embodiment, the DCI comprises first DCI comprising a paging occasion reception indicator field. The paging occasion reception indicator field indicates the paging operation. For example, the paging occasion reception indicator field comprises at least one of: at least one of reserved bits in the first DCI, at least one of reserved bits of a short message field in the first DCI, or a field associated with a configuration of a paging message related operation. Regarding the details related to the first DCI it may be referred to the Embodiment 2 and/or 3 and the content disclosed therein is not narrated herein for brevity.

In an embodiment, the downlink control information further comprises second downlink control information (e.g. the DCI format 1_0). In this embodiment, the first DCI and the second DCI may be scrambled by different RNTIs and/or have different time-frequency resources. As an alternative or in addition, both the first DCI and the second DCI have a bit field used for distinguishing the first DCI and the second DCI. For example, the bit field may indicate one of the first DCI or the second DCI. That is, based on this bit field, the UE is able to determine the received DCI is the first DCI or the second DCI. In this embodiment, the first DCI and the second DCI are different at (e.g. distinguished by) at least one of the RNTI used for scrambling, the time-frequency resource or the bit field indicating one of the first DCI or the second DCI. Regarding the details related to the second DCI it may be referred to the Embodiment 2 and/or 3 and the content disclosed therein is not narrated herein for brevity.

In an embodiment, the second DCI does not have the paging occasion reception indicator field (e.g. the DCI of an existing format). Regarding the details related to the second DCI it may be referred to the Embodiment 2 and/or 3 and the content disclosed therein is not narrated herein for brevity.

In an embodiment, the DCI comprises third DCI with a new DCI format. For example, the third DCI may comprise at least one of a short message field, at least one paging occasion reception indicator field, indicating the paging operation of at least one of the plurality of wireless terminal groups, a short message indicator field, indicating a presence or an absence of at least one of the short message field or the at least one paging occasion reception indicator field, or a reference signal indicator field, indicating a reference signal operation. Regarding the details related to the third DCI it may be referred to the Embodiment 4 and the content disclosed therein is not narrated herein for brevity.

In an embodiment, the third DCI is configured for at least one of the plurality of wireless terminal groups. Regarding the details related to the third DCI it may be referred to the Embodiment 4 and the content disclosed therein is not narrated herein for brevity.

In an embodiment, the DCI further comprises fourth DCI (e.g. in an existing format). In this embodiment, the third DCI and the fourth DCI may be scrambled by different RNTIs and/or, have different time-frequency resources, and/or have different formats. That is, the third DCI and the fourth DCI may be different at (e.g. distinguished by) at least one of the RNTI used for scrambling, the time-frequency resource or the format. Regarding the details related to the fourth DCI it may be referred to the Embodiment 4 and the content disclosed therein is not narrated herein for brevity.

In an embodiment, the fourth DCI does not have the paging occasion reception indicator field. Regarding the details related to the fourth DCI it may be referred to the Embodiment 4 and the content disclosed therein is not narrated herein for brevity.

In an embodiment, the paging occasion reception indicator field comprises a bitmap, wherein each of bits in the bitmap is associated with one of the plurality of wireless terminal groups. Regarding the details related to the paging occasion reception indicator field comprising the bitmap it may be referred to any of the Embodiments 2 to 4 and the content disclosed therein is not narrated herein for brevity.

In an embodiment, the paging occasion reception indicator field comprises at least one ID of the at least one wireless terminal group associated with the paging indication information. For example, the identification is one of a group ID, a UE ID, a subset of the UE ID, a TMSI (e.g. 5G-S-TMSI) or a subset of the TMSI. Regarding the details related to the ID of the at least one wireless terminal group it may be referred to any of the Embodiments 2 to 4 and the content disclosed therein is not narrated herein for brevity.

In an embodiment, the paging indication information comprises at least one of the time domain resource or the frequency domain resource of the PDCCH (e.g. search space). In this embodiment, the wireless terminal monitors the physical downlink control channel based on at least one of the time domain resource or the frequency domain resource. Regarding the details related to the paging indication information comprising at least one of the time domain resource or the frequency domain resource of the PDCCH it may be referred to the Embodiment 5 and the content disclosed therein is not narrated herein for brevity.

In an embodiment, the DCI is associated with a first wireless terminal group. For example, a CRC of the DCI is scrambled by an RNTI. Regarding the details related to the DCI scrambled by the RNTI it may be referred to the Embodiment 6 and the content disclosed therein is not narrated herein for brevity.

In an embodiment, the RNTI comprises at least one of a group common RNTI configured for the first wireless terminal group and at least one second wireless terminal group of the plurality of wireless terminal groups, or a group RNTI configured for the first wireless terminal group. Regarding the details related to the RNTI used for scrambling the DCI it may be referred to the Embodiment 6 and the content disclosed therein is not narrated herein for brevity.

In an embodiment, the DMRS comprises at least one of a DMRS of a PDCCH or a DMRS of a PDSCH. In this embodiment, an identification of the at least one wireless terminal group which is associated with the paging indication information being used for at least one of scrambling the demodulation reference signal or determining an initializing seed of the demodulation reference signal. For example, the identification is one of a group ID, a UE ID, a subset of UE ID, a TMSI (e.g. 5G-S-TMSI) or a subset of the TMSI. Regarding the details related to the DMRS in the paging indication information it may be referred to the Embodiment 7 and the content disclosed therein is not narrated herein for brevity.

Figure 9:
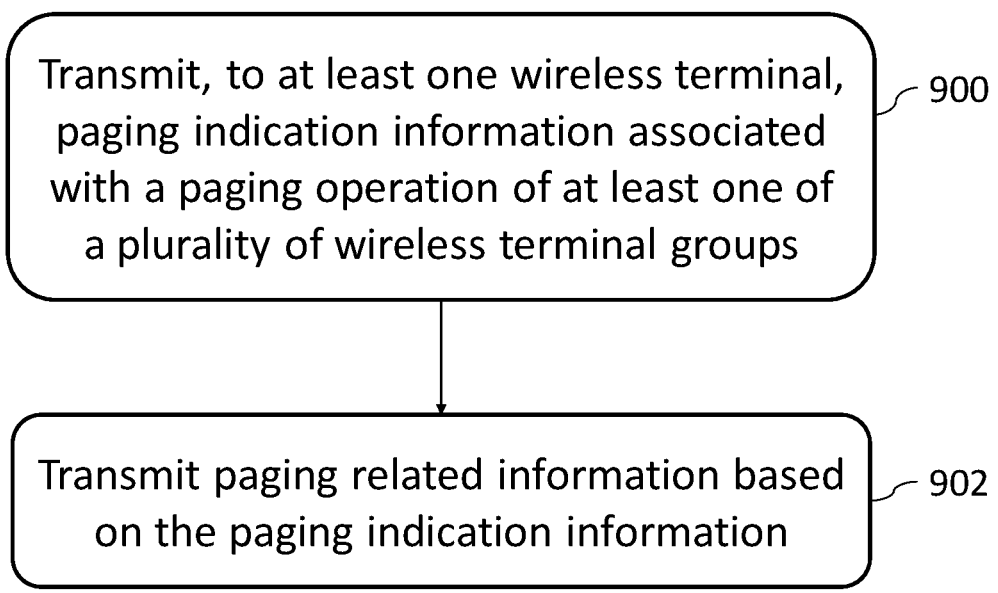
FIG. 9 shows a flowchart of a process according to an embodiment of the present disclosure.

FIG. 9 shows a flowchart of a process according to an embodiment of the present disclosure. The process shown in FIG. 9 may be used in a wireless network node (e.g. the BS or the gNB) and comprises the following steps:

Step 900: Transmit, to at least one wireless terminal, paging indication information associated with a paging operation of at least one of a plurality of wireless terminal groups.

Step 902: Transmit paging related information based on the paging indication information.

More specifically, the wireless network node transmits paging indication information (e.g. the paging DCI with the PO reception indicator field) to at least one wireless terminal (e.g. the UE). The paging indication information associated with a paging operation of at least one of a plurality of wireless terminal groups (e.g. UE groups). Next, the wireless network node transmits paging related information based on (e.g. depending on, in response to) the paging indication information.

In an embodiment, each of the at least one wireless terminal is categorized into one of the plurality of wireless terminal groups based on at least one of: a subset of an identification of the each of the at least one wireless terminal, a paging probability of each of the at least one the wireless terminal, or at least one higher layer signaling. In this embodiment, the identification of the wireless terminal is a UE ID or a TMSI (e.g. 5G-S-TMSI). Regarding the details of dividing the wireless terminals into separate wireless terminal group it may be referred to the Embodiment 1 and the content disclosed therein is not narrated herein for brevity.

In an embodiment, the paging operation comprises at least one of monitoring a paging occasion, not monitoring the paging occasion, receiving, from the wireless network node, at least one of paging scheduling information, a paging message or a reference signal, or not receiving, from the wireless network node, at least one of the paging scheduling information, the paging message or the reference signal. In this embodiment, the reference signal comprises at least one of: an SSB, a CSI-RS or a tracking reference signal. Regarding the details related to the paging operation it may be referred to any of the Embodiments 2 to 7 and the content disclosed therein is not narrated herein for brevity.

In an embodiment, at least one of the paging occasion, the paging scheduling information or the paging message are in a first paging cycle in which the paging indication information is configured. That is, the paging indication information and at least one of the paging occasion, the paging scheduling information or the paging message are in the same paging cycle. Regarding the details related to the paging operation within the first paging cycle in which the paging indication information is configured (e.g. current paging cycle) it may be referred to any of the Embodiments 2 to 7 and the content disclosed therein is not narrated herein for brevity.

In an embodiment, the paging indication information is configured in a first paging cycle and at least one of the paging occasion, the paging scheduling information, the paging message and the reference signal are in at least one second paging cycle subsequent to the first paging cycle. In other words, at least one of the paging occasion, the paging scheduling information, the paging message or the reference signal is in subsequent paging cycles after the paging cycle in which the paging indication information is configured. Regarding the details related to the paging operation within the at least one second paging cycle (e.g. next paging cycle) subsequent to the first paging cycle of the paging indication information (e.g. current paging cycle) it may be referred to the Embodiment 3 and/or 4 and the content disclosed therein is not narrated herein for brevity.

In an embodiment, the paging indication information comprises at least one of DCI, a DMRS, a time domain resource of a PDCCH carrying paging scheduling information or a frequency domain resource of the PDCCH carrying the paging scheduling information. Regarding the details related to the components comprised in the paging indication information it may be referred to the Embodiments 2 to 5 and the content disclosed therein is not narrated herein for brevity.

In an embodiment, the DCI comprises first DCI comprising a paging occasion reception indicator field. The paging occasion reception indicator field indicates the paging operation. For example, the paging occasion reception indicator field comprises at least one of: at least one of reserved bits in the first DCI, at least one of reserved bits of a short message field in the first DCI, or a field associated with a configuration of a paging message related operation. Regarding the details related to the first DCI it may be referred to the Embodiment 2 and/or 3 and the content disclosed therein is not narrated herein for brevity.

In an embodiment, the downlink control information further comprises second downlink control information (e.g. the DCI format 1_0). In this embodiment, the first DCI and the second DCI may be scrambled by different RNTIs and/or have different time-frequency resources. As an alternative or in addition, both the first DCI and the second DCI have a bit field used for distinguishing the first DCI and the second DCI. For example, the bit field may indicate one of the first DCI or the second DCI. That is, based on this bit field, the UE is able to determine the received DCI is the first DCI or the second DCI. In this embodiment, the first DCI and the second DCI are different at (e.g. distinguished by) at least one of the RNTI used for scrambling, the time-frequency resource or the bit field indicating one of the first DCI or the second DCI. Regarding the details related to the second DCI it may be referred to the Embodiment 2 and/or 3 and the content disclosed therein is not narrated herein for brevity.

In an embodiment, the second DCI does not have the paging occasion reception indicator field (e.g. the DCI of an existing format). Regarding the details related to the second DCI it may be referred to the Embodiment 2 and/or 3 and the content disclosed therein is not narrated herein for brevity.

In an embodiment, the DCI comprises third DCI with a new DCI format. For example, the third DCI may comprise at least one of a short message field, at least one paging occasion reception indicator field, indicating the paging operation of at least one of the plurality of wireless terminal groups, a short message indicator field, indicating a presence or an absence of at least one of the short message field or the at least one paging occasion reception indicator field, or a reference signal indicator field, indicating a reference signal operation. Regarding the details related to the third DCI it may be referred to the Embodiment 4 and the content disclosed therein is not narrated herein for brevity.

In an embodiment, the third DCI is configured for at least one of the plurality of wireless terminal groups. Regarding the details related to the third DCI it may be referred to the Embodiment 4 and the content disclosed therein is not narrated herein for brevity.

In an embodiment, the DCI further comprises fourth DCI (e.g. in an existing format). In this embodiment, the third DCI and the fourth DCI may be scrambled by different RNTIs and/or, have different time-frequency resources, and/or have different formats. That is, the third DCI and the fourth DCI may be different at (e.g. distinguished by) at least one of the RNTI used for scrambling, the time-frequency resource or the format. Regarding the details related to the fourth DCI it may be referred to the Embodiment 4 and the content disclosed therein is not narrated herein for brevity.

In an embodiment, the fourth DCI does not have the paging occasion reception indicator field. Regarding the details related to the fourth DCI it may be referred to the Embodiment 4 and the content disclosed therein is not narrated herein for brevity.

In an embodiment, the paging occasion reception indicator field comprises a bitmap, wherein each of bits in the bitmap is associated with one of the plurality of wireless terminal groups. Regarding the details related to the paging occasion reception indicator field comprising the bitmap it may be referred to any of the Embodiments 2 to 4 and the content disclosed therein is not narrated herein for brevity.

In an embodiment, the paging occasion reception indicator field comprises at least one ID of the at least one wireless terminal group associated with the paging indication information. For example, the identification is one of a group ID, a UE ID, a subset of the UE ID, a TMSI (e.g. 5G-S-TMSI) or a subset of the TMSI. Regarding the details related to the ID of the at least one wireless terminal group it may be referred to any of the Embodiments 2 to 4 and the content disclosed therein is not narrated herein for brevity.

In an embodiment, the paging indication information comprises at least one of the time domain resource or the frequency domain resource of the PDCCH (e.g. search space). In this embodiment, the wireless terminal monitors the physical downlink control channel based on at least one of the time domain resource or the frequency domain resource. Regarding the details related to the paging indication information comprising at least one of the time domain resource or the frequency domain resource of the PDCCH it may be referred to the Embodiment 5 and the content disclosed therein is not narrated herein for brevity.

In an embodiment, the DCI is associated with a first wireless terminal group. For example, a CRC of the DCI is scrambled by an RNTI. Regarding the details related to the DCI scrambled by the RNTI it may be referred to the Embodiment 6 and the content disclosed therein is not narrated herein for brevity.

In an embodiment, the RNTI comprises at least one of a group common RNTI configured for the first wireless terminal group and at least one second wireless terminal group of the plurality of wireless terminal groups, or a group RNTI configured for the first wireless terminal group. Regarding the details related to the RNTI used for scrambling the DCI it may be referred to the Embodiment 6 and the content disclosed therein is not narrated herein for brevity.

In an embodiment, the DMRS comprises at least one of a DMRS of a PDCCH or a DMRS of a PDSCH. In this embodiment, an identification of the at least one wireless terminal group which is associated with the paging indication information being used for at least one of scrambling the demodulation reference signal or determining an initializing seed of the demodulation reference signal. For example, the identification is one of a group ID, a UE ID, a subset of UE ID, a TMSI (e.g. 5G-S-TMSI) or a subset of the TMSI. Regarding the details related to the DMRS in the paging indication information it may be referred to the Embodiment 7 and the content disclosed therein is not narrated herein for brevity.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
   receiving, from a wireless network node, paging indication information associated with a paging operation of at least one of a plurality of wireless terminal groups, and
   performing the paging operation based on the paging indication information, wherein the paging indication information comprises downlink control information (DCI),
   wherein, the downlink control information comprises at least one of a third downlink control information or a fourth downlink control information,
   wherein the third downlink control information and the fourth downlink control information are different in being scrambled by different radio network temporary identifiers and/or having different formats and
   wherein the fourth downlink control information does not have a paging occasion reception indicator field.

2. The wireless communication method of claim 1, wherein the wireless terminal is categorized into one of the plurality of wireless terminal groups based on at least one of:
   a subset of an identification of the wireless terminal, or
   at least one higher layer signaling,
   wherein the identification of the wireless terminal is a user equipment identification or a temporary mobile subscription identifier.

3. The wireless communication method of claim 1, wherein the third downlink control information comprises at least one of:
   at least one paging occasion reception indicator field, indicating the paging operation of at least one of the plurality of wireless terminal groups, or
   a reference signal indicator field, indicating activating a reference signal, or de-activating a reference signal.

4. The wireless communication method of claim 3, wherein the paging occasion reception indicator field indicates a wireless terminal in a corresponding wireless terminal group to monitor or not to monitor a paging occasion within a current paging cycle.

5. The wireless communication method of claim 3, wherein the paging occasion reception indicator field comprises a bitmap, wherein each of bits in the bitmap is associated with one of the plurality of wireless terminal groups.

6. The wireless communication method of claim 5, wherein a size of the bitmap equals to a number of the wireless terminal groups.

7. The wireless communication method of claim 1, wherein the fourth downlink control information indicates paging operations of corresponding wireless terminals, and N bits out of reserved bits in the fourth downlink control information indicate the paging operations of the corresponding wireless terminals, where N is an integer which is greater than or equal to 0 and is smaller than or equal to 6.

8. The wireless communication method of claim 7, wherein the paging operations indicated by the fourth downlink control information comprise at least one of activating a reference signal, or de-activating a reference signal.

9. The wireless communication method of claim 3, wherein the reference signal comprises a tracking reference signal.

10. The wireless communication method of claim 1, wherein the third DCI is before DCI format 1_0 scrambled by P-RNTI in a time domain.

11. A wireless communication method for use in a wireless network node, the wireless communication method comprising:
    transmitting, to at least one wireless terminal, paging indication information associated with a paging operation of at least one of a plurality of wireless terminal groups, and
    transmitting paging related information based on the paging indication information,
    wherein the paging indication information comprises downlink control information, DCI,
    wherein the downlink control information comprises at least one of a third downlink control information or a fourth downlink control information,
    wherein the third downlink control information and the fourth downlink control information are different at at least one of being scrambled by different radio network temporary identifiers, or having different formats, and
wherein the fourth downlink control information does not have a paging occasion reception indicator field.

12. The wireless communication method of claim 11, wherein each of the at least one wireless terminal is categorized into one of the plurality of wireless terminal groups based on at least one of:
   a subset of an identification of each of the at least one wireless terminal, or
   at least one higher layer signaling,
   wherein the identification of each of the at least one wireless terminal is a user equipment identification or a temporary mobile subscription identifier.

13. The wireless communication method of claim 11, wherein the third downlink control information comprises at least one of:
   at least one paging occasion reception indicator field, indicating the paging operation, or
   a reference signal indicator field, indicating activating a reference signal, or de-activating a reference signal.

14. The wireless communication method of claim 13, wherein the paging occasion reception indicator field indicates a wireless terminal in a corresponding wireless terminal group to monitor or not to monitor a paging occasion within a current paging cycle.

15. The wireless communication method of claim 13, wherein the paging occasion reception indicator field comprises a bitmap, wherein each of bits in the bitmap is associated one of the plurality of wireless terminal groups.

16. The wireless communication method of claim 15, wherein a size of the bitmap equals to a number of the wireless terminal groups.

17. The wireless communication method of claim 11, wherein the fourth downlink control information indicates paging operations of corresponding wireless terminals, and N bits out of reserved bits in the fourth downlink control information indicate the paging operations of the corresponding wireless terminals, where N is an integer which is greater than or equal to 0 and is smaller than or equal to 6; and
   wherein the paging operations indicated by the fourth downlink control information comprise at least one of activating a reference signal, or de-activating a reference signal.

18. The wireless communication method of claim 13, wherein the reference signal comprises a tracking reference signal.

19. The wireless communication method of claim 11, wherein the third DCI is before DCI format 1_0 scrambled by P-RNTI in a time domain.

20. A wireless terminal, comprising:
   a communication unit, configured to receive, from a wireless network node, paging indication information associated with a paging operation of at least one of a plurality of wireless terminal groups, and
   a processor configured to perform the paging operation based on the paging indication information,
   wherein the paging indication information comprises downlink control information, DCI, wherein the downlink control information comprises at least one of a third downlink control information or a fourth downlink control information,
   wherein the third downlink control information and the fourth downlink control information are different at at least one of being scrambled by different radio network temporary identifiers, or having different formats, and
   wherein the fourth downlink control information does not have a paging occasion reception indicator field.

* * * * *